(12) United States Patent
Pianigiani et al.

(10) Patent No.: US 10,742,501 B1
(45) Date of Patent: Aug. 11, 2020

(54) AUTOMATION OF MAINTENANCE MODE OPERATIONS FOR NETWORK DEVICES

(71) Applicant: Juniper Networks, Inc., Sunnyvale, CA (US)

(72) Inventors: Jacopo Pianigiani, Cupertino, CA (US); Michal Styszynski, Cupertino, CA (US); Atul S Moghe, San Jose, CA (US); Joseph Williams, Pleasanton, CA (US); Sahana Sekhar Palagrahara Chandrashekar, San Jose, CA (US); Tong Jiang, Fremont, CA (US); Rishabh Ramakant Tulsian, Livermore, CA (US); Manish Krishnan, Sunnyvale, CA (US); Soumil Ramesh Kulkarni, San Jose, CA (US); Vinod Nair, San Jose, CA (US); Jeba Paulaiyan, San Jose, CA (US); Sukhdev S. Kapur, Saratoga, CA (US); Ashok Ganesan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 77 days.

(21) Appl. No.: 16/230,156

(22) Filed: Dec. 21, 2018

(51) Int. Cl.
*G06F 15/177* (2006.01)
*H04L 12/24* (2006.01)
(Continued)

(52) U.S. Cl.
CPC ........ *H04L 41/082* (2013.01); *H04L 41/0816* (2013.01); *H04L 41/0886* (2013.01);
(Continued)

(58) Field of Classification Search
USPC ....... 709/203, 206, 217, 219, 221, 223, 224, 709/226, 228, 230, 232, 238; 370/352
See application file for complete search history.

(56) References Cited

U.S. PATENT DOCUMENTS 9,641,435 B1  5/2017 Sivaramakrishnan et al.
2002/0176404 A1* 11/2002 Girard ................ H04M 7/1225
                                                              370/352
(Continued)

FOREIGN PATENT DOCUMENTS

WO  2013184846 A1  12/2013

OTHER PUBLICATIONS

U.S. Appl. No. 16/417,015, filed May 20, 2019, Juniper Networks, Inc. (inventor: Kapur et al.) entitled "Automation of Maintenance Mode Operations for Network Devices".
(Continued)

*Primary Examiner* — Quang N Nguyen
(74) *Attorney, Agent, or Firm* — Shumaker & Sieffert, P.A.

(57) ABSTRACT

An example method includes determining, by a network controller, based on a high-level data model, vendor-agnostic device information for a first network device, translating the vendor-agnostic device information into vendor-specific device information, sending, to the first network device, first configuration information included in the vendor-specific device information to cause the first network device to switch into a maintenance mode and enable diversion of network traffic from the first network device to a second network device, responsive to verifying that the first network device has diverted the traffic, initiating maintenance procedures on the first network device while the first network device is in the maintenance mode, and sending, to the first network device, second configuration information included in the vendor-specific device information to cause the first network device to switch out of the maintenance mode and enable reversion of network traffic from the second device to the first network device.

20 Claims, 7 Drawing Sheets

(51) Int. Cl.
    *H04L 12/813*     (2013.01)
    *H04L 12/781*     (2013.01)
    *H04L 12/803*     (2013.01)

(52) U.S. Cl.
    CPC .............. *H04L 41/12* (2013.01); *H04L 45/52* (2013.01); *H04L 47/125* (2013.01); *H04L 47/20* (2013.01)

(56) References Cited

U.S. PATENT DOCUMENTS

| | | | | |
|---|---|---|---|---|
| 2010/0318699 | A1* | 12/2010 | Gao-Saari | G16H 40/40 710/72 |
| 2015/0127792 | A1* | 5/2015 | Messinger | H04L 41/0843 709/221 |
| 2016/0328719 | A1* | 11/2016 | Ananchaperumal | H04W 4/70 |
| 2017/0214717 | A1* | 7/2017 | Bush | G05B 19/0426 |
| 2019/0394286 | A1* | 12/2019 | Chunduru Venkata | H04L 41/5048 |
| 2020/0101611 | A1* | 4/2020 | Ramanujam | B25J 9/1671 |

OTHER PUBLICATIONS

"Blueprint for hitless procedure for image upgrade" Juniper Networks, Inc., Contrail-Specs 5.1, hitless_image_upgrade.md, GitHub available at https://github.com/Juniper/contrail-specs/blob/master/5.1/hitless_image_upgrade.md (accessed Nov. 28, 2018), 7 pp.

Przygienda et al. "RIFT: Routing in Fat Trees", draft-ieff-rift-rift-01, RIFT Working Group, Internet-Draft, Apr. 26, 2018, 78 pp.

Saint-Andre, "Extensible Messaging and Presence Protocol (XMPP): Core," RFC 6120, Internet Engineering Task Force (IETF), Mar. 2011, 211 pp.

U.S. Appl. No. 16/221,698, filed Dec. 17, 2018 and entitled "Network Device Configuration Using a Message Bus."

U.S. Appl. No. 15/198,657, filed Jun. 30, 2016, and entitled "Translating High-Level Configuration Instructions to Low-Level Device Configuration."

* cited by examiner

AUTOMATION OF MAINTENANCE MODE OPERATIONS FOR NETWORK DEVICES

TECHNICAL FIELD

This disclosure relates to computer networks.

BACKGROUND

In a typical data center, a large collection of interconnected servers provides computing and/or storage capacity for execution of various applications. For example, a data center may comprise a facility that hosts applications and services for subscribers or customers of the data center. The data center may, for example, host all of the infrastructure equipment, such as networking and storage systems, redundant power supplies, and environmental controls. In most data centers, clusters of storage systems and application servers are interconnected via a high-speed network fabric provided by one or more tiers of physical network devices, such as switches and routers. More sophisticated data centers provide infrastructure spread throughout the world with subscriber support equipment located in various physical hosting facilities. In some network topologies, routers within the fabric may be layered in a multi-staged configuration that allows for various aspects of path minimization, redundancy, and efficient routing of network traffic within the fabric.

Software Defined Networking (SDN) platforms may be used in data centers, and in some cases, may use a logically centralized and physically distributed SDN controller, and a distributed forwarding plane in virtual routers that extend the network from physical routers and switches in the data center into a virtual overlay network hosted in virtualized servers. The SDN controller provides management, control, and analytics functions of a virtualized network that includes the virtual routers.

The various network devices included in the fabric typically include mechanisms, such as management interfaces, for locally or remotely configuring these devices. By interacting with the management interface of the network devices, an administrator or other user can manually perform configuration tasks to configure the devices, and the user can also manually perform operational commands on the devices to manage, collect, and/or view operational data of the devices. For example, the user may configure interface cards of the device, adjust parameters for supported network protocols, specify physical components within the device, modify routing information maintained by a router, access software modules and other resources residing on the device, and/or perform other configuration tasks. In addition, the user may also provide commands to view current operating parameters, system logs, information related to network connectivity, network activity, or other status information from the devices, as well as view and react to event information received from the devices.

In some cases, the network fabric may include multiple network devices of different types, e.g., from different vendors. Vendors often provide different protocols for managing devices. For example, different vendors of routers may offer different protocols for configuring services performed by these routers.

SUMMARY

In general, this disclosure describes techniques for automation of maintenance mode or related configuration operations for network devices, such devices in a data center. For example, a network controller may be configured to selectively initiate maintenance mode operations (e.g., software upgrade and/or other operations), on one or more network devices in the network, while these devices are in a maintenance mode. The network controller is configured to selectively initiate these operations in an ordered, strategic manner based on various factors and/or input, such as topology information about the network and/or information obtained from the network devices. Prior to performance of the maintenance mode operations on a given network device, the network controller may verify that network traffic has been drained from the given device and diverted to another device in the network.

Once the maintenance mode operations have been completed on the given network device, the network controller can restore the network device to its original state, and may also verify that network traffic has been reverted back to the device. In certain examples, the network controller may selectively configure the fabric beforehand, such as when network devices are initially brought under the management scope of the controller. At this stage, the network controller may inject certain configurations into network devices of the network, which are kept temporarily inactive on the devices. Then, prior to initiating the performance of maintenance mode operations on the network devices, the network controller may activate the previously injected configurations on these devices.

Implementation of one or more of the techniques described herein may automate the configuration of network devices in a network, in a structured and strategic fashion, prior to performing maintenance mode operations (e.g., software upgrade operations), without disrupting existing services and availability, and without loss of network traffic through the network. As will also be described in further detail below, implementation of one or more of the described techniques may achieve a multivendor approach for hitless upgrade procedures and traffic drain for different network devices in the network, without necessarily relying on the proprietary nature of vendor-specific procedures and/or capabilities.

In one example, a method includes determining, by a network controller comprising one or more processors, and based on a high-level data model associated with a topology of a network, vendor-agnostic device information for a first network device in the network, translating, by the network controller, the vendor-agnostic device information into vendor-specific device information for the first network device, and sending, by the network controller and to the first network device, first configuration information that is included in the vendor-specific device information, wherein sending the first configuration information causes the first network device to switch into a maintenance mode and enables a diversion of network traffic from the first network device to a second network device in the network. The example method further includes, responsive to verifying that the first network device has diverted traffic to the second network device, initiating, by the network controller, one or more maintenance procedures on the first network device while the first network device is in the maintenance mode, and sending, by the network controller and to the first network device, second configuration information that is included in the vendor-specific device information, wherein sending the second configuration information causes the first network device to switch out of the maintenance mode and enables a reversion of network traffic from the second device back to the first network device.

In one example, a network controller system includes at least one data store configured to store device information for network devices in a network, and at least one processor communicatively coupled to the at least one data store. The at least one processor includes processing circuitry configured to determine, based on a high-level data model associated with a topology of the network, vendor-agnostic device information for a first network device in the network, to translate the vendor-agnostic device information into vendor-specific device information for the first network device, and to send, to the first network device, first configuration information that is included in the vendor-specific device information, wherein sending the first configuration information causes the first network device to switch into a maintenance mode and enables a diversion of network traffic from the first network device to a second network device in the network. The processing circuitry is further configured to, responsive to verifying that the first network device has diverted traffic to the second network device, initiate one or more maintenance procedures on the first network device while the first network device is in the maintenance mode, and to send, to the first network device, second configuration information that is included in the vendor-specific device information, wherein sending the second configuration information causes the first network device to switch out of the maintenance mode and enables a reversion of network traffic from the second device back to the first network device.

In one example, a method includes receiving, by a first network device and from a network controller, first configuration information that is included in vendor-specific device information for the first network device, and, responsive to receiving the first configuration information, switching, by the first network device, into a maintenance mode to enable a diversion of network traffic from the first network device to a second network device in the network. The example method further includes, after network traffic has been diverted from the first network device to the second network device, performing, by the first network device, one or more maintenance procedures while the first network device is in the maintenance mode, receiving, by the first network device and from the network controller, second configuration information that is included in the vendor-specific device information, and, after receiving the second configuration information, switching, by the first network device, out of the maintenance mode to enable a reversion of network traffic from the second device back to the first network device.

The details of one or more examples are set forth in the accompanying drawings and the description below. Other features, objects, and advantages of the disclosure will be apparent from the description and drawings, and from the claims.

DETAILED DESCRIPTION

Figure 1:
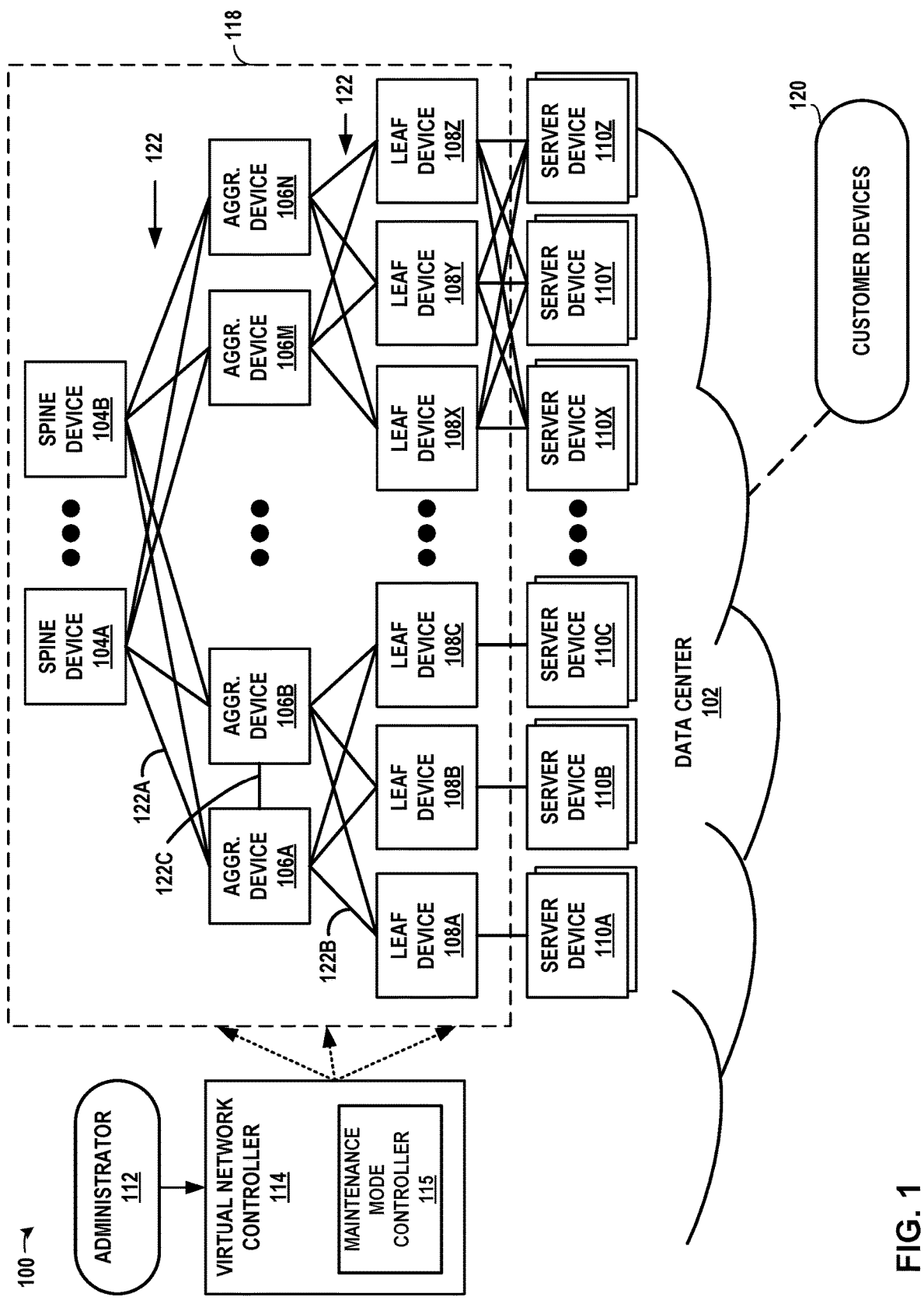
FIG. 1 is a block diagram illustrating an example network including a data center in which examples of the techniques described herein may be implemented.

Performing various maintenance mode operations on network devices, such as image or software upgrades, are often time-consuming tasks. As one example, whenever a network device is re-imaged, it goes through a series of steps that also includes a reboot. Depending on the size of the image, it may take twenty to thirty minutes for the network device to come up and start functioning again. During this procedure, if live traffic is still going through the network device, a number of packets will be lost. This packet loss has an adverse effect on the performance of the network fabric, especially if multiple devices are being upgraded at the same time.

Data center and private cloud architectures (e.g., IP Clos with an Ethernet virtual private network (EVPN) control plane) often deliver business services for enterprises IT. These services often directly affect the core business of the customer, and therefore these architectures should provide highly available and reliable infrastructures, in which maintenance mode operations (e.g., software upgrades) can be performed without undue disruption of existing services, and without loss of traffic. As a result, in order to avoid loss of traffic, network devices within the network may be configured to divert traffic flowing through the devices while they perform maintenance mode operations, allowing operability of the infrastructure while maintaining service availability.

As described above, the present disclosure generally describes techniques for the automation of maintenance mode or related configuration operations for network devices, which may, in some cases, achieve a multivendor approach for hitless upgrade procedures and traffic drain for different network devices in the network, without necessarily relying on the proprietary nature of vendor-specific procedures and/or capabilities. A network controller may be configured to selectively initiate maintenance mode operations (e.g., software upgrade and/or other operations), on one or more network devices in the network, while these devices are in a maintenance mode. The network controller is configured to selectively initiate these operations in an ordered, strategic manner based on various factors and/or input, such as topology information about the network and/or information obtained from the network devices (e.g., state information and/or information associated with network traffic). Prior to performance of the maintenance mode operations, the network controller may verify that network traffic has been drained from the given device and diverted to another device in the network. Once the maintenance mode operations have been completed, the network controller can restore the network device to its original state, verifying that network traffic has been restored to the device.

In certain examples, the network controller may selectively configure the fabric beforehand, such as when network devices are initially brought under the management scope of the controller. At this preliminary stage, the network controller may inject certain configurations into network devices of the network (e.g., a combination of underlay routing protocols policies and overlay routing protocols policies). In some cases, specific standard protocol extensions (e.g., AS-PATH in case of underlay Border Gateway Protocol (BGP)) are configured and kept temporarily inactive, e.g., as part of the underlay configuration of these devices. Then, prior to initiating the performance of maintenance mode operations on the network devices, the network controller may activate the previously injected configurations on these devices, allowing traffic to be diverted from devices that undergo such operations (e.g., software upgrades).

FIG. 1 is a block diagram illustrating an example network 100 including a data center 102 in which examples of the techniques described herein may be implemented. In general, data center 102 provides an operating environment for applications and services for customer devices 120 coupled to the data center, e.g., by a service provider network (not shown). Data center 102 may, for example, host infrastructure equipment, such as networking and storage systems, redundant power supplies, and environmental controls. In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example of FIG. 1, data center 102 may be a facility that provides network services for customer devices 120. Customer devices 120 may be devices of entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 102 may include individual network servers, network peers, or otherwise. In some examples, data center 102 is an enterprise or internal data center.

In this example, data center 102 includes a set of storage systems and application servers 110A-110Z (collectively, "servers 110") interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices. In the example of FIG. 1, IP fabric 118 includes three tiers of devices: one or more spine devices 104A-104B (collectively, "spine devices 104"), one or more aggregation devices 106A-106N (collectively, "aggregation devices 106"), and one or more leaf devices 108A-108Z (collectively, "leaf devices 108"). Other topologies may be used in other examples. Servers 110 provide execution and storage environments for applications and data associated with customer devices 120 and may be physical servers, virtual machines or combinations thereof.

In general, IP fabric 118 represents layer two (L2) and layer three (L3) switching and routing components that provide point-to-point connectivity between servers 110. In one example, IP fabric 118 comprises a set of interconnected, high-performance, packet-based routers and switches that implement industry standard protocols. In one example, IP fabric 118 may comprise off-the-shelf components that provide Internet Protocol (IP) point-to-point connectivity.

In FIG. 1, virtual network controller 114 provides a high-level controller for configuring and managing routing and switching infrastructure of data center 102. Virtual network controller 114 may represent, in certain examples, a software defined network (SDN) controller that communicates and manages the devices of data center 102 using an SDN protocol, such as the Path Computation Element (PCE) Communication Protocol (PCEP). In some examples, virtual network controller 114 may communicate and manage the devices of data center 102 using eXtensible Messaging and Presence Protocol (XMPP), PCEP or Border Gateway Protocol (BGP) messages. Additionally or alternatively, virtual network controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 114 provides a logically, and in some cases, physically, centralized controller for facilitating operation of one or more virtual networks within data center 102 in accordance with examples of this disclosure. For example, virtual network controller 114 may include one or more controller devices that are included in network 100, where the one or more controller devices include, individually and/or collectively, at least one processor comprising processing circuitry. In some examples, virtual network controller 114 may include at least one data store that is configured to store device information for network devices in network 100 (e.g., devices within fabric 118). In some examples, virtual network controller 114 may operate in response to configuration input received from network administrator 112. Additional information regarding virtual network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within IP fabric 118, such as packet flows between servers 110, can traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as the Transmission Control Protocol (TCP) or User Datagram Protocol (UDP), and source port and destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a TCP connection, all PDUs sourced by a particular MAC address or IP address, all PDUs having the same VLAN tag, or all PDUs received at the same switch port.

As shown in the example of FIG. 1, each of spine devices 104 is communicatively coupled to each of aggregation devices 106 in IP fabric 118. Aggregation devices 106A and 106B are coupled to each of leaf devices 108A-108C, while aggregation devices 106M and 106N are coupled to each of leaf devices 108X-108Z. Multi-stage data center networks, such as Clos or networks with a so-called "fat tree" topology, may be used in data centers for high performance and resiliency. These fat tree networks may allow for multi-pathing. As one example, a Virtual Chassis Fabric (VCF), in addition to allowing a multi-staged Clos network to be managed as a single device, also allows path weights to reflect and react to path's end-to-end bandwidth. Such a capability is termed "smart trunks" in VCF. The smart trunks capabilities are enabled by the Virtual Chassis Control Protocol (VCCP) that runs inside a VCF to provide globally optimized weights on the multi-paths.

An IP fabric, such as IP fabric 118, is a loosely-federated folded multi-stage network where all devices of the fabric run IP routing protocols. The routing protocols, which may include, for example, external border gateway protocol (EBGP), include all paths between leaf devices 108 in IP fabric 118, and equal cost multipath (ECMP) is used to utilize all paths. For instance, there may be eight paths between any two leaf devices 108 in IP fabric 118, assuming each path traverses aggregation devices 106 twice and one of spine devices 104. The Routing in Fat Trees (RIFT) protocol allows use of any set of all available least-hops paths disregarding ECMP constraints. Additional information regarding RIFT can be found in Internet-Draft entitled RIFT: Routing in Fat Trees (draft-ietf-rift-rift-01), dated Apr. 26, 2018, as promulgated by the Internet Engineering Task Force (IETF), which is incorporated herein by reference.

In some multi-staged networks such as IP fabric 118, each switch resides in a defined layer of the network. As shown in the example of FIG. 1, spine devices 104 reside in a first, top layer, aggregation devices 106 reside in a second or middle layer, and leaf devices 108 reside in a third or bottom layer. Further, each of the devices 104, 106, 108 may have various connectivity to other switches in the IP fabric 118. For example, spine devices 104 and aggregation devices 106 may each have links 122A connecting each of the switches between the first layer and the second layer. Similarly, the aggregation devices 106 and the leaf devices 108 also may also include links 122B connecting each of the switches between the second layer and the third layer.

In some examples, various links 122 are identified based on their use relative to a particular switch within the IP fabric 118. More specifically, and as used herein, some links 122 are identified as "ascending" links 122A (also referred to as "north-bound" links), some links 122 are identified as "descending" links 122B (also referred to as "south-bound" links), and some links 122 are identified as "lateral" links 122C (also referred to as "east-west" links). From the perspective of a particular switch, such as aggregation device 106A, an ascending link 122A is a link 122 that supports connectivity to a neighbor switch (or just "neighbor") (e.g., spine device 104A) at a higher level in the network topology (e.g., the IP fabric 118), and a descending link 122B is a link 122 that supports connectivity to a neighbor switch (e.g., leaf device 108A) at a lower level in the network topology. Similarly, a lateral link 122C is a link 122 that supports connectivity to a neighbor switch (e.g., aggregation device 106B) at the same level in the network topology.

In accordance with some example aspects of the techniques of this disclosure, network controller 114 may implement a maintenance mode controller 115 to selectively apply maintenance mode or related configuration operations for network devices in fabric 118, which may, in some cases, achieve a multivendor approach for hitless upgrade procedures and traffic drain for different network devices in fabric 118, without necessarily relying on the proprietary nature of vendor-specific procedures and/or capabilities. Maintenance mode controller 115 may, in various different examples, be implemented in hardware circuitry, software, firmware, or any combination thereof.

For example, maintenance mode controller 115 may be configured to selectively initiate maintenance mode operations (e.g., software upgrade and/or other operations), on one or more network devices in fabric 118, while these devices are in a maintenance mode. Maintenance mode controller 115 can initiate maintenance mode operations in an ordered manner based on network topology information and/or information obtained from network devices in fabric 118, such as information about the state of network traffic and progress of the software upgrade, for example. For example, prior to performance of the maintenance mode operations on a given network device, maintenance mode controller 115 may verify that network traffic has been drained from the given device and diverted to another device in fabric 118.

Once the maintenance mode operations have been completed on the given network device, maintenance mode controller 115 can restore the network device to its original state, and may also verify that network traffic has been reverted back to the device. In certain examples, maintenance mode controller 115 may selectively configure fabric 118 beforehand (e.g., based on the network topology and/or state), such as when network devices within fabric 118 (e.g., one or more of spine devices 104, aggregation devices 106, leaf devices 108) are initially brought under the management scope of network controller 114. At this preliminary stage, maintenance mode controller 115 may inject certain configurations into network devices of fabric 118 (e.g., a combination of underlay routing protocols policies and overlay routing protocols policies).

In some cases, specific standard protocol extensions (e.g., AS-PATH in case of underlay Border Gateway Protocol (BGP)) are configured and kept temporarily inactive, e.g., as part of the underlay configuration of these devices. For example, prior to initially configuring a device, maintenance mode controller 115 may capture state information for the device, such as BGP community information associated with the device and corresponding priority information for network paths on the device. Maintenance mode controller 115 may utilize this community and/or priority information when setting relative priorities in the configuration information that is sent to the device for management of maintenance mode operations. For example, maintenance mode controller 115 may set such relative priority information in the configuration information that is sent and kept initially as inactive on the network device. Then, prior to initiating the performance of maintenance mode operations on the network devices, maintenance mode controller 115 may activate the previously injected configurations on these devices by sending further configuration information to initiate the maintenance mode on the network device, allowing traffic to be diverted from the device before it undergoes maintenance operations (e.g., software upgrades).

Implementation of one or more of the techniques described herein may selectively configure network devices (e.g., one or more of spine devices 104, aggregation devices 106, leaf devices 108) in fabric 118 of network 100 prior to performing maintenance mode operations (e.g., software upgrade operations), without disrupting existing services and availability, and without loss of network traffic through fabric 118. As described in further detail below, using one or more of the described techniques may achieve a multivendor approach for hitless upgrade procedures and traffic drain for different network devices in the network, without necessarily relying on the proprietary nature of vendor-specific procedures and/or capabilities.

Figure 5:
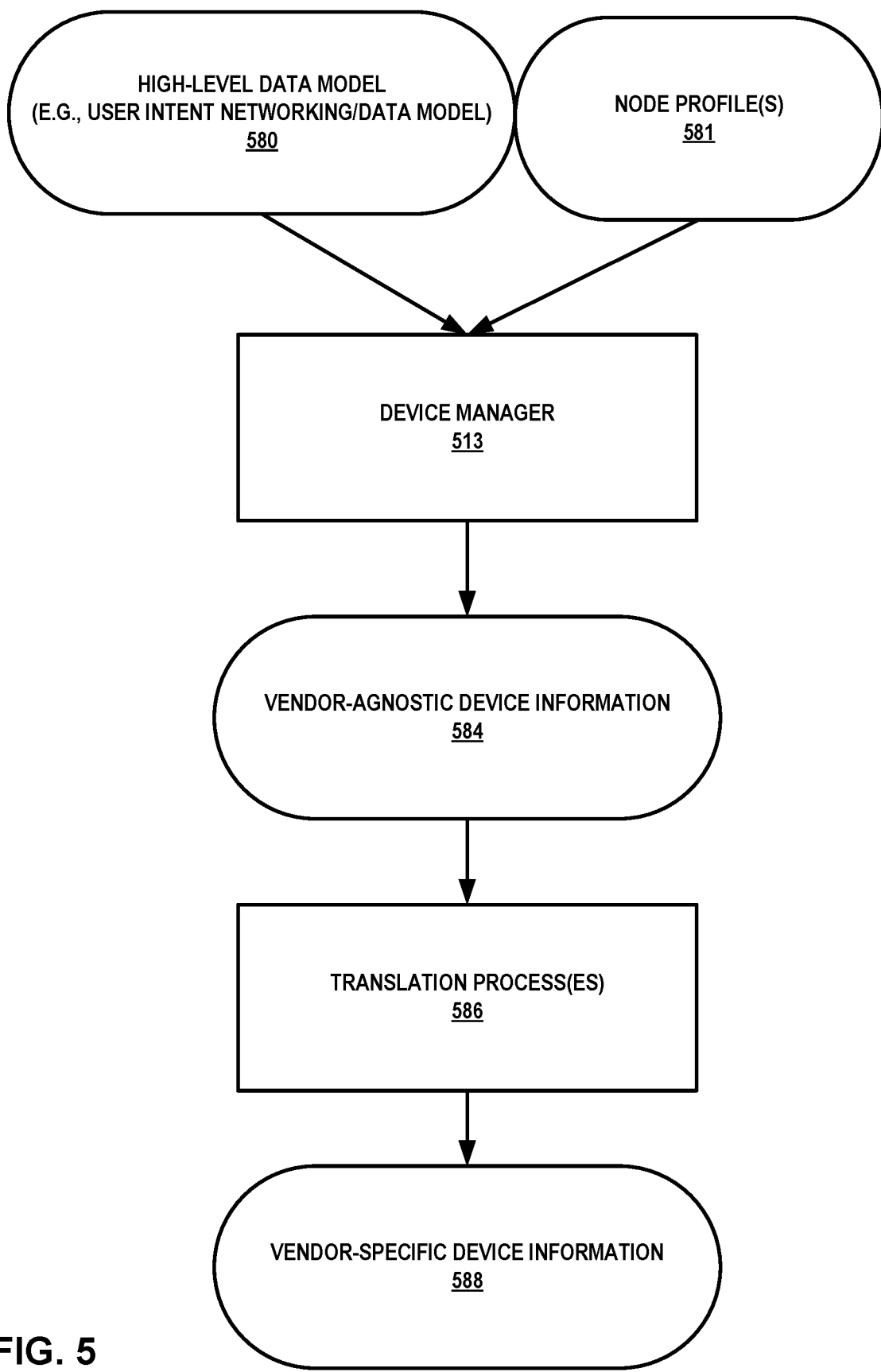
FIG. 5 is a conceptual diagram illustrating an example of a translation of vendor-agnostic device information into vendor-specific device information based on a high-level data model, in accordance with one or more techniques of the disclosure.

For example, and as shown in more detail in FIG. 5, maintenance mode controller 115 may determine, and based on a high-level data model associated with a topology of network 100, vendor-agnostic device information for a first network device (e.g., one of spine devices 104 or leaf devices 108). Maintenance mode controller 115 may translate the vendor-agnostic device information into vendor-specific device information for the first network device, and may send, to the first network device, first configuration information that is included in the vendor-specific device information. Sending the first configuration information causes the first network device to switch into a maintenance mode and enable diversion of network traffic from the first network device to a second, different network device in network 100.

Responsive to verifying that the first network device has diverted traffic to the second network device, maintenance mode controller 115 may initiate one or more maintenance procedures on the first network device while the first network device is in the maintenance mode, and send, to the first network device, second configuration information that is included in the vendor-specific device information. In some cases, maintenance mode controller 115 may send the second configuration information to the first network device after completion of the one or more maintenance procedures on the first network device. Sending the second configuration information causes the first network device to switch out of the maintenance mode and enable reversion of network traffic from the second device back to the first network device. In some examples, maintenance mode controller 115 may determine, based on a topology of network 100, a defined order in which to place network devices into the maintenance mode (e.g., individual groups of network devices in sequence and/or in parallel). These processes will be described in further detail below.

Figure 2:
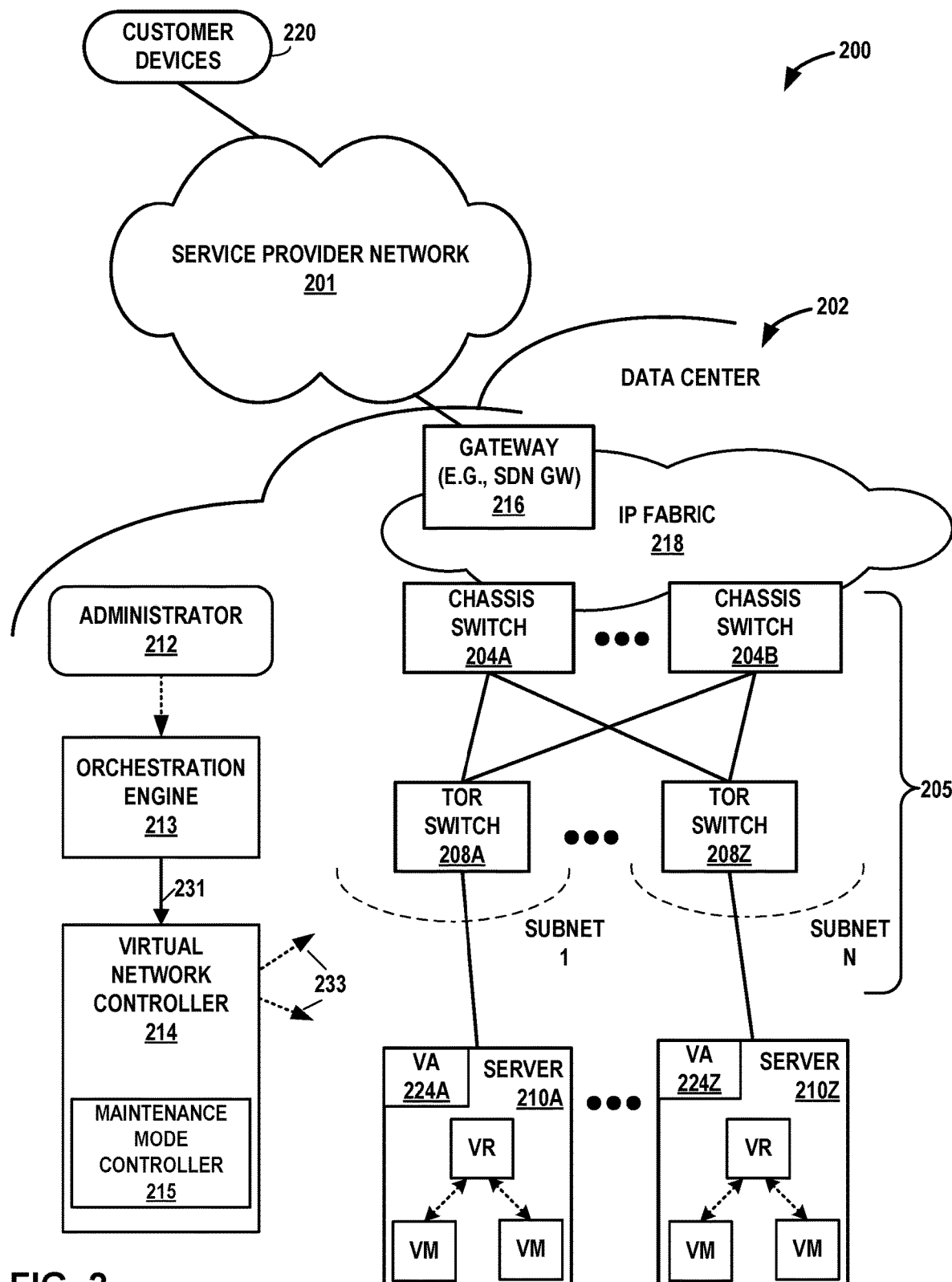
FIG. 2 is a block diagram illustrating another example network having a data center in which examples of the techniques described herein may be implemented.

FIG. 2 is a block diagram illustrating an example network 200 in which virtual network controller 214 and virtual agents of servers 210A-210X (hereinafter, "servers 210") operate in accordance with the techniques described herein to ensure customer traffic flow and customer applications executing within the cloud data center continue without interruption.

In general, data center 202 provides an operating environment for applications and services for customer devices 220 coupled to the data center 202 by service provider network 201. Data center 202 hosts infrastructure equipment, such as networking and storage systems, redundant power supplies, and environmental controls. Service provider network 201 may be coupled to one or more networks administered by other providers, and may thus form part of a large-scale public network infrastructure, e.g., the Internet.

In some examples, data center 202 may represent one of many geographically distributed network data centers. As illustrated in the example of FIG. 2, data center 202 is a facility that provides network services for customer devices 220. Customer devices 220 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 202 is an individual network server, a network peer, or otherwise. In some examples, customer devices 220 may be one example of customer devices 120 shown in FIG. 1, data center 202 may be one example of data center 102, IP fabric 218 may be one example of IP fabric 118, virtual network controller 214 may be one example of virtual network controller 114, and servers 210A-210X (collectively, "servers 210") may be examples of servers 110.

In the example illustrated in FIG. 2, data center 202 includes a set of storage systems and application servers interconnected via high-speed switch fabric 205 of IP fabric, provided by one or more tiers of physical network switches and routers. Servers 210 function as compute nodes of data center 202. In some examples, the terms "compute nodes" and "servers" are used interchangeably herein to refer to servers 210. For example, each of servers 210 may provide an operating environment for execution of one or more customer-specific virtual machines ("VMs" in FIG. 2). Switch fabric 205 is provided by a set of interconnected top-of-rack (TOR) switches 208A-208Z (collectively, "TOR switches 208") coupled to a distribution layer of chassis switches 204A-204B (collectively, "chassis switches 204"). TOR switches may be one example of leaf devices 108 illustrated in FIG. 1, and chassis switches 204 may be one example of spine devices 104. Although not shown, data center 202 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 2, TOR switches 208 and chassis switches 204 provide servers 210 with redundant (multi-homed) connectivity to IP fabric 218. Chassis switches 204 aggregate traffic flows and provides high-speed connectivity between TOR switches 208. TOR switches 208 are network devices that provide layer two (e.g., MAC) and/or layer 3 (e.g., IP) routing and/or switching functionality. TOR switches 208 and chassis switches 204 each include one or more processors and one or more memory devices, and they are capable of executing one or more software processes. Chassis switches 204 are coupled to IP fabric 218, which performs layer 3 routing to route network traffic between data center 202 and customers 220 by service provider network 201. Software-Defined Network ("SDN") gateway 216 acts to forward and receive packets between IP fabric 218 and service provider network 201.

Virtual network controller 214 provides a logically and in some cases physically centralized controller for facilitating operation of one or more virtual networks within data center 202 in accordance with one or more examples of this disclosure. For example, virtual network controller 214 may include one or more controller devices that are included in network 200, where the one or more controller devices include, individually and/or collectively, at least one processor comprising processing circuitry. In some examples, virtual network controller 214 may include at least one data store that is configured to store device information for network devices in network 200. The terms SDN controller and Virtual Network Controller ("VNC") may be used interchangeably throughout this disclosure. In some examples, virtual network controller 214 operates in response to configuration input received from orchestration engine 213 via northbound Application Programming Interface (API) 231, which in turn operates in response to configuration input received from administrator 212. Additional information regarding virtual network controller 214 operating in conjunction with other devices of data center 202 or other software-defined network is found in International Application Number PCT/US2013/044378, referenced earlier.

In some examples, orchestration engine 213 manages functions of data center 202 such as compute, storage, networking, and application resources. For example, orchestration engine 213 may create a virtual network for a tenant within data center 202 or across data centers. Orchestration engine 213 may attach virtual machines (VMs) to a tenant's virtual network. Orchestration engine 213 may connect a tenant's virtual network to some external network, e.g. the Internet or a virtual private network (VPN). Orchestration engine 213 may implement a security policy across a group of VMs or to the boundary of a tenant's network. Orchestration engine 213 may deploy a network service (e.g. a load balancer) in a tenant's virtual network.

In some examples, virtual network controller 214 manages the network and networking services such load balancing, security, and allocate resources from servers 210 to various applications via southbound API 233. That is, southbound API 233 represents a set of communication protocols utilized by virtual network controller 214 to make the actual state of the network equal to the desired state as specified by orchestration engine 213. One such communication protocol may include a messaging protocol such as XMPP, for example. For example, virtual network controller 214 implements high-level requests from orchestration engine 213 by configuring physical switches, e.g. TOR switches 208, chassis switches 204, and switch fabric 205; physical routers; physical service nodes such as firewalls and load balancers; and virtual services such as virtual firewalls in a VM. Virtual network controller 214 maintains routing, networking, and configuration information within a state database. Virtual network controller 214 communicates a suitable subset of the routing information and configuration information from the state database to virtual router agents (VA) 224A-224Z (collectively, "VA 224") on each of servers 210A-210Z.

Typically, the traffic between any two network devices, such as between network devices within IP fabric 218 (not shown) or between servers 210 and customer devices 220 or between servers 210, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

As described herein, each of servers 210 include a respective virtual router ("VR" in FIG. 2) that executes multiple routing instances for corresponding virtual networks within data center 202 and routes the packets to appropriate virtual machines executing within the operating environment provided by the servers. Packets received by the virtual router of server 210A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router of a given server buffers and aggregates multiple tunneled packets received from the underlying physical network fabric prior to delivery to the appropriate routing instance for the packets. That is, a virtual router executing on one of servers 210 may receive inbound tunnel packets of a packet flow from TOR switches 208 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 210 are described in U.S. Pat. No. 9,641,435, entitled "PACKET SEGMENTATION OFFLOAD FOR VIRTUAL NETWORKS," incorporated herein by reference.

In the example of FIG. 2, virtual network controller 214 learns and distributes routing and other information (such as configuration information) to all compute nodes in the data center 202. The VR agent 224A-224Z, running inside the compute node (e.g., inside respective server 210A-210Z), upon receiving the routing information from virtual network controller 214, typically programs the data forwarding element (virtual router) with the forwarding information. Virtual network controller 214 sends routing and configuration information to the VR agent 224 using a messaging protocol such as XMPP protocol rather than using a more heavyweight protocol such as a routing protocol like BGP. In XMPP, SDN controllers and agents communicate routes and configuration over the same channel. Virtual network controller 214 acts as a messaging protocol client when receiving virtual routes from one or more of VR agents 224, and the one or more VR agents 224 acts as a messaging protocol server in that case. Conversely, virtual network controller 214 acts as a messaging protocol server to VR agents 224 as the messaging protocol client when the SDN controller sends routes to VR agents 224.

According to the techniques of the disclosure, and similar to network controller 114 described in FIG. 1, network controller 214 may implement a maintenance mode controller 215 to provide automation of maintenance mode or related configuration operations for network devices in fabric 218 and 205, which may, in some cases, achieve a multivendor approach for hitless upgrade procedures and traffic drain for different network devices, without necessarily relying on the proprietary nature of vendor-specific procedures and/or capabilities. Maintenance mode controller 215 can initiate maintenance mode operations in an ordered and strategic manner based on network topology information and/or information obtained from network devices in fabric 118, such as information about the state of network traffic and progress of the software upgrade, for example. Maintenance mode controller 215 may, in various different examples, be implemented in hardware circuitry, software, firmware, or any combination thereof.

For example, maintenance mode controller 215 may be configured to selectively initiate maintenance mode operations (e.g., software upgrade and/or other operations), on one or more network devices in fabric 218 (e.g., one or more of chassis switches 204 or TOR switches 208), while these devices are in a maintenance mode. Prior to performance of the maintenance mode operations on a given network device, maintenance mode controller 215 may verify that network traffic has been drained from the given device and diverted to another device in fabric 218.

Once the maintenance mode operations have been completed on the given network device, maintenance mode controller 215 can restore the network device to its original state, and may also verify that network traffic has been reverted back to the device. In certain examples, maintenance mode controller 215 may selectively configure fabric 218 beforehand (e.g., based on the network topology and/or state), such as when network devices within fabric 218 (e.g., one or more of chassis switches 204 or TOR switches 208) are initially brought under the management scope of network controller 214. For example, prior to initially configuring a device, maintenance mode controller 215 may capture state information for the device, such as BGP community information associated with the device and corresponding priority information for network paths on the device. Maintenance mode controller 215 may utilize this community and/or priority information when setting relative priorities in the configuration information that is sent to the device for management of maintenance mode operations. For example, maintenance mode controller 215 may set such relative priority information in the configuration information (e.g., a combination of underlay routing protocol policies and overlay routing protocol policies), which is sent and kept initially as inactive on the network device. In some cases, specific standard protocol extensions (e.g., AS-PATH in case of underlay Border Gateway Protocol (BGP)) are configured and kept temporarily inactive, e.g., as part of the underlay configuration of these devices. Then, prior to initiating the performance of maintenance mode operations on the network devices, maintenance mode controller 215 may activate the previously injected configurations on these devices by sending further configuration information to initiate the maintenance mode on the network device, allowing traffic to be diverted from the device before it undergoes maintenance operations (e.g., software upgrades).

Figure 3:
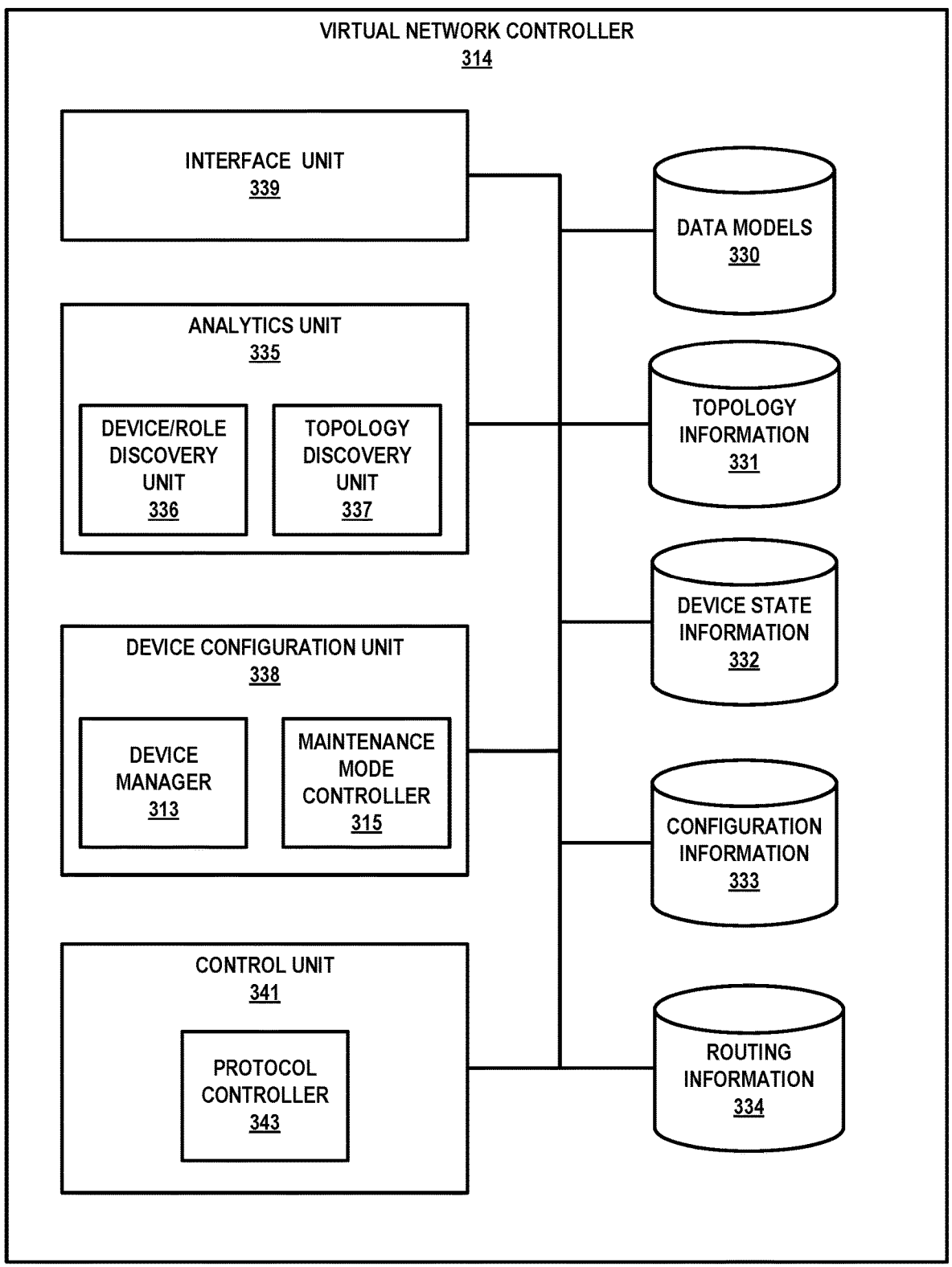
FIG. 3 is a block diagram illustrating an example of a virtual network controller that may be included in the network of FIG. 1 and/or FIG. 2, and which may automate the configuration and initiation of maintenance mode operations on one or more network devices in the network, in accordance with one or more techniques of the disclosure.

FIG. 3 is a block diagram illustrating an example of a virtual network controller 314 that may be included in the network of FIG. 1 and/or FIG. 2, and which may automate the configuration and initiation of maintenance mode operations on one or more network devices in a network, in accordance with one or more techniques of the disclosure. Virtual network controller 314 may be one example of virtual network controller 114 (FIG. 1) and/or virtual network controller 214 (FIG. 2).

In some examples, virtual network controller 314 may include one or more controller devices that are included in a network, where the one or more controller devices include, individually and/or collectively, at least one processor comprising processing circuitry (not shown in FIG. 3). This processing circuitry may, in some cases, execute software instructions, such as those used to define one or more software or computer programs, stored to a computer-readable storage medium (not shown in FIG. 3), such as non-transitory computer-readable mediums including a storage device or a memory that stores instructions to cause the one or more processors to perform the techniques described herein. Alternatively, or additionally, the at least one processor may comprise dedicated hardware (e.g., one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware) for performing the techniques described herein.

As illustrated in FIG. 3, virtual network controller 314 includes an analytics unit 335, a device configuration unit 338, an interface unit 339, and a control unit 341. In general, each of analytics unit 335, device configuration unit 338, interface unit 339, and control unit 341 may be implemented as software, hardware, firmware, or any combination thereof, and may be distributed across one or more hardware computing platforms that provide an environment for implementation of these units (e.g., distributed across one or more control devices in a network). Moreover, each of analytics unit 335, device configuration unit 338, interface unit 339, and control unit 341 may maintain state data, which may be stored within a centralized or distributed database.

For example, as illustrated in FIG. 3, virtual network controller 314 includes various data stores or databases, which as noted above, may be stored centrally or in a distributed fashion across the nodes of virtual network controller 314. These data stores include data models 330, topology information 331, device state information 332, configuration information 333, and routing information 334. Analytics unit 335, device configuration unit 338, interface unit 339, and control unit 341 are all communicatively coupled to data models 330, topology information 331, device state information 332, configuration information 333, and routing information 334.

In general, analytics unit 335 is tasked with collecting, storing, correlating, and analyzing information from virtual and physical network elements and/or devices within a data center (e.g., data center 102 or 202). This information may include statistics, logs, events, and/or errors for use in managing the routing and network configuration of the data center. Analytics unit 335 may store this information one or more of topology information 331, device state information 332, configuration information 333, and/or routing information 334. Interface unit 339 may be configured to provide a communication interface to one or more entities external to virtual network controller 314, such as to administrator 112 (FIG. 1), administrator 212 (FIG. 2), and/or orchestration engine 213 (FIG. 2). In some examples, analytics unit 335 may provide collected information, and/or any information stored in topology information 331, device state information 332, configuration information 333, or routing information 334 to interface unit 339, which may output such information to one or more external entities, such as administrator 112/212 or orchestration engine 213.

In some examples, interface unit 339 may provide any of such information to administrator 112/212 via a portal application, which may be included in or coupled to interface unit 339. The portal application may provide user interface functionality through which the user can provide input to and receive output from the portal application. For example, interface unit 339 may output the log and/or state information to the user via this portal application, such that the user may be informed of such information (e.g., before, during, and/or after maintenance operations are performed).

As illustrated in FIG. 3, analytics unit 335 includes a device/role discovery unit 336, and a topology discovery unit 337. Topology discovery unit 337 may be configured to collect, store, correlate, and analyze topology information from the network and fabric, which may be stored in topology information 331. For example, in reference to the example of FIG. 1, topology discovery unit 337 may collect and determine topology information associated with fabric 118 of network 100 in data center 102, such as the particular topology of spine devices 104, aggregation devices 106, and leaf devices 108 that are communicatively coupled to server devices 110, and this information may be stored in topology information 331. In reference to the example of FIG. 2, topology discovery unit 337 may collect and determine topology information associated with fabric 218 and 205, such as the particular topology of chassis switches 204 and TOR switches 208. Over time, as network devices are added or removed from corresponding networks, topology discovery unit 337 may be capable of determining the updated topology information and/or changes, which may be stored in topology information 331.

Device/role discovery unit 336 may be configured to collect or retrieve information from the particular network devices that are in a network at a given period of time, as well as the roles of these devices. As noted above, over time, individual network devices may be added or removed from the network (e.g., network 100 or 200). Device/role discovery unit 336 is configured to identify whether devices have been added or removed, as well as to identify device information that is associated with these devices. Device/role discovery unit 336 may store such information in topology information 331 and/or device state information 332. Device/role discovery unit 336 may also store device role information (e.g., whether a device is a spine or leaf device, whether a device is a chassis switch/TOR switch/router/etc.) in topology information 331 and/or device state information 332.

Device configuration unit 338 of virtual network controller 314 may be configured to configure one or more of the network devices within a network (e.g., in network 100 of FIG. 1 and/or network 200 of FIG. 2). Device configuration unit 338 may access any of data models 330, topology information 331, device state information 332, configuration information 333, and/or routing information 334 when configuring the network devices. Device configuration unit 338 may also store any information, including configuration information, in any of these data stores.

In some examples, device configuration unit 338 presents a northbound application programming interface (API) that interface with orchestration engine 213 (FIG. 2), such as via interface unit 339. Orchestration engine 213 uses this interface to install configuration state using the high-level data model, which may be stored by virtual network controller 314 in data models 330. Device configuration unit 338 may further include a transformer or translator that discovers changes in the high-level model of orchestration engine 213 and transforms these changes into corresponding changes in the low-level data models managed by virtual network controller 314, which may include vendor-agnostic and/or vendor-specific configuration information, as described in further detail below. Device configuration unit 338 may also include, e.g., an Interface to Metadata Access Points (IF-MAP) server that provides a southbound API to push computed low-level configurations to maintenance mode controller 315 and/or control unit 341. Device/role discovery unit 336 and topology discovery unit 337 of analytics unit 335 may also process vendor-agnostic and/or vendor-specific information and/or commands when interacting with network devices in the network.

Device configuration unit 338 may include a device manager 313. In various examples, and as further described below in reference to FIG. 5, device manager 313 may be configured to generate vendor-agnostic device information (e.g., configuration and/or command information) based on a high-level data model, such as a model stored in data models 330.

Device configuration unit 338 may also include a maintenance mode controller 315. Maintenance mode controller 315 may be one example of maintenance mode controller 115 (FIG. 1) and/or maintenance mode controller 215 (FIG. 2).

As shown in the example of FIG. 3, maintenance mode controller 315 is included in device configuration unit 338. However, in other examples, maintenance mode controller 315 may be included in control unit 341. In some examples, the functionality provided by maintenance mode controller 315 may be distributed between device configuration unit 338 and control unit 341. Each of device configuration unit 338 and control unit 341 have access to all of the data stores illustrated in FIG. 3, including configuration information 333.

For example, maintenance mode controller 315 may be configured to selectively initiate maintenance mode operations (e.g., software upgrade and/or other operations), on one or more network devices in a network, while these devices are in a maintenance mode. Prior to performance of the maintenance mode operations on a given network device, maintenance mode controller 315 may verify that network traffic has been drained from the given device and diverted to another device in the network. Once the maintenance mode operations have been completed on the given network device, maintenance mode controller 315 can restore the network device to its original state, and may also verify that network traffic has been reverted back to the device.

In certain examples, maintenance mode controller 315 may selectively configure the fabric beforehand (e.g., based on the network topology and/or state), such as when network devices within the fabric (e.g., one or more of spine devices 104, aggregation devices 106, leaf devices 108 shown in FIG. 1, or one or more of chassis switches 204, TOR switches 208 shown in FIG. 2) are initially brought under the management scope of network controller 314. At this preliminary stage, maintenance mode controller 315 may inject certain configurations into the network devices (e.g., a combination of underlay routing protocols policies and overlay routing protocols policies). In some cases, specific standard protocol extensions (e.g., AS-PATH in case of underlay Border Gateway Protocol (BGP)) are configured and kept temporarily inactive, e.g., as part of the underlay configuration of these devices. Then, prior to initiating the performance of maintenance mode operations on the network devices, maintenance mode controller 315 may activate the previously injected configurations on these devices, allowing traffic to be diverted from devices that undergo such operations (e.g., software upgrades). In various examples, configuration information may include routing instance and/or forwarding policy information.

In some examples, maintenance mode controller 315 may translate high-level data models associated with a topology of the network into lower-level models suitable for interacting with network elements or devices, such as the network devices shown in FIGS. 1 and 2, and/or the VR agents 224 shown in FIG. 2. In some cases, virtual network controller 314 may receive, via interface unit 339, high-level data models (e.g., user intent-based network or data models) from an orchestration engine, such as orchestration engine 213 shown in FIG. 2, and/or administrator 112/212. These models may be associated with a topology of a network, as indicated by topology information 331. Virtual network controller 314 may store these models within data models 330, which is accessible to maintenance mode controller 315.

As will be described in further detail below (e.g., in reference to FIG. 4), maintenance mode controller 315 may determine, based on a high-level data model included in data models 330, vendor-agnostic device information for a first network device in the network (e.g., one of spine devices 104 in FIG. 1, one of chassis switches 204 in FIG. 2). Maintenance mode controller 315 may then translate the vendor-agnostic device information into vendor-specific device information for the first network device. In some examples, the vendor-agnostic device information and vendor-specific device information may be stored in one or more of the data stores illustrated in FIG. 3, such as device state information 332.

Maintenance mode controller 315 may send, to the first network device, first configuration information that is included in the vendor-specific device information (e.g., first underlay routing protocol policy information and first overlay routing protocol policy information), which causes the first network device to switch into a maintenance mode and enable diversion of network traffic from the first network device to a second network device in the network (e.g., another one of spine devices 104 in FIG. 1, another one of chassis switches 204 in FIG. 2).

Responsive to verifying that the first network device has diverted traffic to the second network device, maintenance mode controller 315 may initiate one or more maintenance procedures (e.g., software upgrade procedures, other maintenance operations) on the first network device while the first network device is in the maintenance mode. Maintenance mode controller 315 then sends, to the first network device, second configuration information that is included in the vendor-specific device information (e.g., second underlay routing protocol policy information and second overlay routing protocol policy information), which causes the first network device to switch out of the maintenance mode and enable reversion of network traffic from the second device back to the first network device. Maintenance mode controller 315 keeps a persistent copy of configuration state of virtual network controller 314 in one or more of the data stores illustrated in FIG. 3.

In certain examples, maintenance mode controller 315 may receive an indication of a one or more network devices in the network. For example, an administrator (e.g., administrator 112, administrator 212), or an orchestration engine (e.g., orchestration engine 213) may specify (e.g., via interface unit 339) one or more particular network devices within the network that are to be, e.g., upgraded, updated, or otherwise maintained. In some cases, an administrator may simply request that the entire network be upgraded or maintained, as appropriate, enabling maintenance mode controller 315 to determine the specific devices that should be placed in maintenance mode.

For example, upon receiving an indication of a group of network devices included in the network, maintenance mode controller 315 may determine, based on the topology of the network, a maintenance mode strategy. Maintenance mode controller 315 may then select, based on the strategy, one or more network devices in the network to configure for maintenance mode operations.

For instance, in reference to the example of FIG. 1, administrator 112 may provide input (e.g., via a user interface) to perform a software upgrade of switches in fabric 118, as appropriate. Maintenance mode controller 315 may determine a maintenance mode strategy to determine which network device to upgrade first. More particularly, maintenance mode controller 315 may determine, based on the topology of the network (e.g., as indicated in topology information 331), a defined order in which to place the network devices into the maintenance mode.

For instance, based on the defined topology, maintenance mode controller 315 may determine to first upgrade spine device 104A, then to upgrade spine device 104B, and then to upgrade leaf devices 108. The defined order may specify certain devices that are to be maintained or upgraded in sequence. However, the defined order may also allow other devices to be maintained or upgraded in batches (e.g., in parallel). For example, based on the determined maintenance mode strategy, maintenance mode controller 315 may determine that spine device 104A should be maintained or upgraded before spine device 104B. However, the strategy may allow maintenance mode controller 315 to maintain or upgrade leaf devices 108 in parallel. In some cases, the maintenance mode strategy may define the order in which to perform maintenance mode operations based on a defined role of the network devices in the network. In these cases, maintenance mode controller 315 may communicate with device/role discovery unit 336, or access device state information 332, to identify these roles.

In certain cases, prior to sending the first configuration information, maintenance mode controller 315 sends, to the first network device, maintenance mode configuration information that is included in the vendor-specific device information. However, this initial maintenance mode configuration information is inactive on the first network device. For instance, the initial maintenance mode configuration information may include a combination of underlay routing protocol policies and overlay routing protocol policies, where specific standard protocol extensions (e.g., AS-PATH in the case where BGP is the underlay protocol) are configured and kept inactive as part of the underlay configuration of the first network device. In some examples, BGP community properties may be used to control whether devices are inactive. In various cases, maintenance mode controller 315 sends this initial maintenance mode configuration information to all network devices included in the network or fabric, such that this initial configuration information is kept inactive as part of the underlay configuration for all of the devices.

Subsequently, when maintenance mode controller 315 implements its maintenance mode strategy and determines an order in which network devices are to be maintained or upgraded, maintenance mode controller 315 sends the first configuration information to the identified network devices to activate the previously injected configurations (e.g., to activate the initial maintenance mode configuration information), allowing traffic to be diverted from those devices that are to undergo maintenance (e.g., for software upgrades). Sending this subsequent first configuration information to activate the previously injected maintenance mode configuration information enables respective network devices to switch into the maintenance mode and enable diversion of network traffic to other devices (e.g., other devices that have the same Ethernet segment identifier (ESI)).

Upon completion of maintenance mode operations on a given network device, maintenance mode controller 315 sends second configuration information to the network device to deactivate the maintenance mode configuration information and cause the network device to switch out of the maintenance mode and enable reversion of network traffic back to the device. Through the translation of vendor-agnostic device configuration information into vendor-specific device configuration information for each individual network device, a multivendor approach for hitless upgrade procedures and traffic drain can be achieved via use of maintenance mode controller 315, without necessarily relying on the vendor-specific procedures and capabilities for each network device in the network.

Furthermore, in those examples in which maintenance mode controller 315 sends initial configuration information that is kept inactive on the network devices, and then subsequently sends follow-up configuration information to active the previously injection configurations on the devices, certain performance and bandwidth benefits may be achieved. The initial configuration information may include more detailed or lengthy information that may be pushed down to network devices at any point in time, prior to performance of maintenance operations. When maintenance operations are to be performed, the subsequent configuration information may be small in size and targeted in nature, only being pushed by maintenance mode controller 315 to those devices that are to be placed in maintenance mode, including only sufficient information to active the previously injected configuration. In such fashion, the subsequent configuration information may be smaller in size, thereby achieving potential bandwidth and performance benefits.

After a given network device has been configured to operate in maintenance mode, maintenance mode controller 315 may verify that the network device has properly drained and diverted the traffic to another, separate device in the network (e.g., chassis switch 204A draining and diverting traffic to chassis switch 204B). To do so, in some examples, maintenance mode controller 315 may analyze existing state information associated with the network device and/or information received from the network device. For example, maintenance mode controller 315 may monitor status of BGP session(s) between virtual network controller 314 and the network device, and analyze state information associated with the monitored BGP session with the network device. In some cases, maintenance mode controller 315 may send, to the network device in question, command information that is included in the vendor-specific device information. This command information includes a request for network traffic information associated with traffic flow through the network device. In response to sending this command information, maintenance mode controller 315 may receive, from the network device, the network traffic information associated with the traffic flow through the network device (e.g., based on interface statistics collected by the network device). In some cases, maintenance mode. Maintenance mode controller 315 may verify, based on existing state information and/or information received from the network device, that network traffic has been drained and diverted to another device. In some cases, maintenance mode controller 315 may interact with device/role discovery unit 336 of analytics unit 335 to communicate with the network devices in this manner, and may store captured information in device state information 332.

Similarly, after maintenance mode controller 315 sends the configuration information to cause the network device to switch out of maintenance mode and resume prior operation, maintenance mode controller 315 may send further command information that is included in the vendor-specific device information, where the command information includes a request for network traffic information associated with traffic flow through the network device. Maintenance mode controller 315 may then verify, based on received network traffic information received from the network device, that network traffic has been properly reverted back to the network device.

Furthermore, maintenance mode controller 315 may properly assess whether the network device is properly functioning by comparing a pre-maintenance mode state to a post-maintenance mode state. Maintenance mode controller 315 may also utilize pre-maintenance mode state information to determine how to configure one or more network devices for entry into a maintenance mode. Prior to a network device entering maintenance mode, maintenance mode controller 315 may capture system state information of the network device. After the device has completed performing maintenance operations (e.g., software upgrade operations), and has switched out of maintenance mode, maintenance mode controller 315 may again capture system state information of the network device. Maintenance mode controller 315 may then compare the captured state information to verify the proper operational mode of the network device. In some cases, maintenance mode controller 315 may interact with device/role discovery unit 336 of analytics unit 335 to communicate with the network devices and to obtain and store such state information, which may be stored in device state information 332.

The captured state information may include, in some examples, BGP configuration information associated with a network device, such as BGP community information and corresponding priority information for network paths on the device. In some cases, maintenance mode controller 315 may utilize this BGP community and/or priority information when setting relative priorities in the configuration information that is sent to the network device for management of maintenance mode operations. For instance, in certain examples, maintenance mode controller 315 may set such relative priority information in the configuration information that is sent and kept initially as inactive on the network device, and then later activated by maintenance mode controller 315 upon sending further configuration information to initiate the maintenance mode on the network device.

As illustrated in FIG. 3, virtual network controller 314 also includes a control unit 341. Control unit 341 may implement a logically centralized control plane responsible for maintaining network state. Control unit 341 interacts with network elements, such as the network devices shown in FIG. 1, and/or the network devices and/or VR agents 224 shown in FIG. 2, to ensure that the network state is eventually consistent with desired state as specified by an orchestration engine (e.g., orchestration engine 213). In some examples, control unit 341 receives configuration state information of virtual network controller 314 from device configuration unit 338. Further, control unit 341 exchanges routes with VR agents (e.g., VR agents 224 on servers 210, as shown in FIG. 2) via XMPP. Control unit 341 also communicates the configuration state information, such as routing instances and forwarding policy, to VR agents (e.g., VR agents 224), via, e.g., XMPP, for installation within respective virtual routers. In some examples, control unit 341 may proxy traffic on behalf of servers (e.g., servers 210 in FIG. 2). These proxy requests may be received over XMPP. XMPP is described in further detail in P. Saint-Andre, Extensible Messaging and Presence Protocol (XMPP): Core, IETF RFC 6120, March 2011, the entire contents of which is incorporated by reference herein.

Further, control unit 341 may exchange routes with a gateway (e.g., gateway 216) via BGP, and exchange the configuration state of virtual network controller 314 with network devices in a fabric (e.g., spine devices 104/aggregation devices 106/leaf devices 108 in FIG. 1, chassis switches 204/TOR switches 208 in FIG. 2) via NET CONF. As described above, the functions provided by maintenance mode controller 315 may be part of device configuration unit 338, control unit 341, or a combination thereof, which have access to configuration information 333.

As shown in FIG. 3, control unit 341 includes a protocol controller 343, which is capable of controlling communication between virtual network controller 314 and other devices, agents, entities, and the like via one or more communication protocols, such as for example, an XMPP protocol, a NET CONF protocol, a BGP protocol, and/or an IF-MAP protocol, to list a few examples.

In some examples, control unit 341 receives configuration state from maintenance mode controller 315 using IF-MAP. Control unit 341 may include one or more control nodes that exchange routes with other control nodes using IBGP to ensure that all control nodes have the same network state. As described above, control unit 341 exchanges routes with the VR agents on the compute nodes (e.g., servers 210) using XMPP. Control unit 341 may also use XMPP to send configuration state such as routing instances and forwarding policy.

Control unit 341 exchanges BGP messages with BGP peers, including any network devices configured to communicate via BGP, and also including any gateway nodes (e.g., gateway 216 shown in FIG. 2). Protocol controller 343 may store stores routing information associated with any devices in the network, including compute nodes (e.g., servers 210 shown in FIG. 2), in routing information 334. Additional information regarding one or more examples of a virtual network (e.g., SDN) controller operating in conjunction with other devices is described in U.S. patent application Ser. No. 16/221,698, filed on Dec. 17, 2018 and entitled "NETWORK DEVICE CONFIGURATION USING A MESSAGE BUS," which is incorporated herein by reference.

Figure 4:
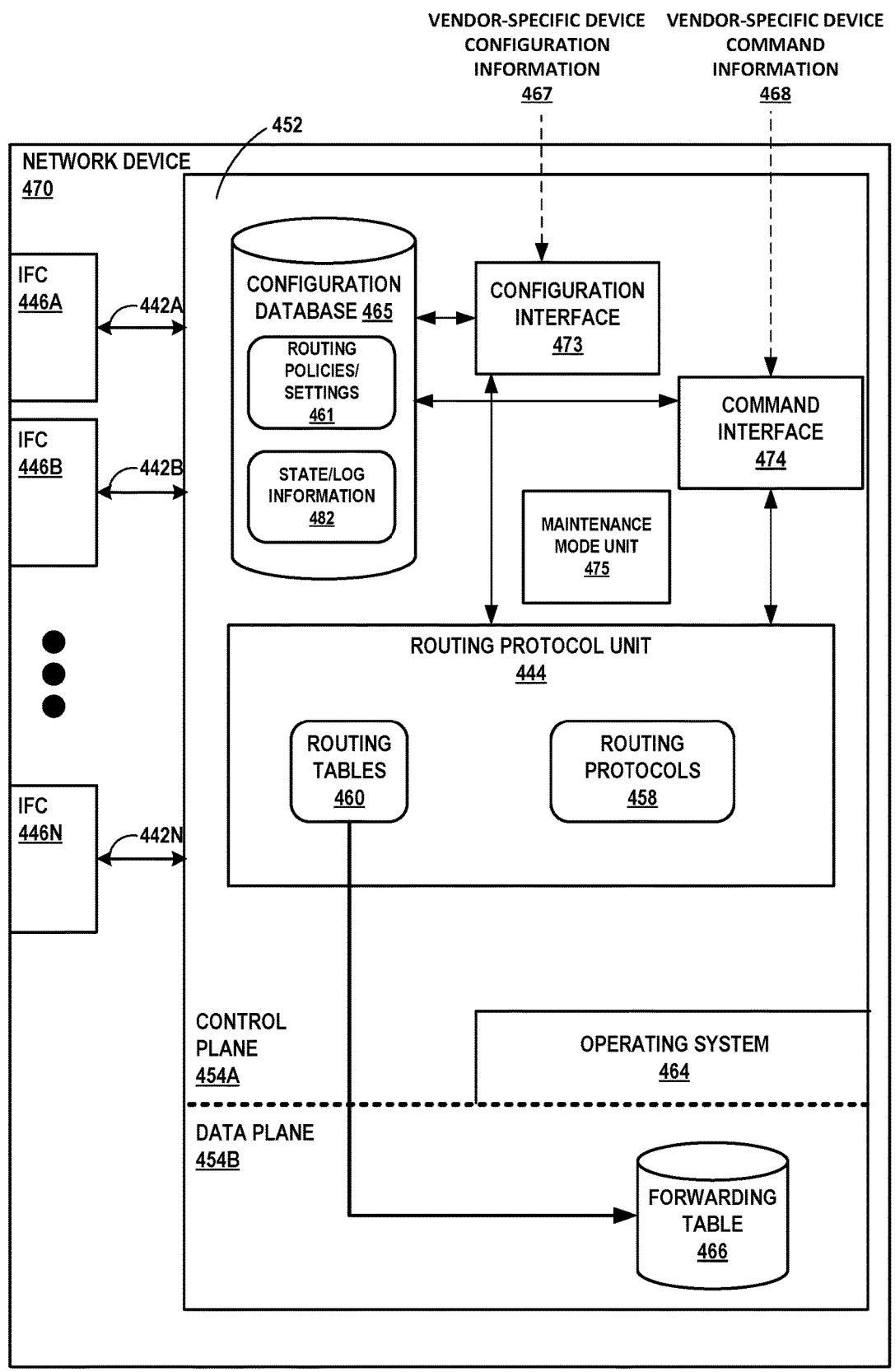
FIG. 4 is a block diagram illustrating an example of a network device (e.g., router or switch) that may be configured to perform maintenance mode operations, in accordance with one or more techniques of the disclosure.

FIG. 4 is a block diagram illustrating an example of a network device 470 (e.g., router or switch) that may be configured to perform maintenance mode operations, in accordance with one or more techniques of the disclosure. Network device 470 may be an example of one of the network devices illustrated in FIG. 1 (e.g., one or spine devices 104, aggregation devices 106, leaf devices 108) and/or FIG. 2 (e.g., one of chassis switches 204, TOR switches 208).

Network device 470 includes a control unit 452 and interface cards 446A-446N (collectively, "IFC's 446") coupled to control unit 452 via respective internal links 442A-442N. In some examples, control unit 452 may comprise one or more processors (not shown in FIG. 4), comprising processing circuitry, which execute software instructions, such as those used to define one or more software or computer programs, stored to a computer-readable storage medium (not shown in FIG. 4), such as non-transitory computer-readable mediums including a storage device or a memory that stores instructions to cause the one or more processors to perform the techniques described herein. Alternatively, or additionally, control unit 452 may comprise dedicated hardware (e.g., one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware) for performing the techniques described herein.

In the example of FIG. 4, control unit 452 is divided into two logical or physical "planes" to include a first control or routing plane 454A ("control plane 454A") and a second data or forwarding plane 454B ("data plane 454B"). That is, control unit 452 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 454A represents hardware or a combination of hardware and software of control unit 452 that define control plane functionality of network device 470. Control plane 454A manages and controls the behavior of network device 470, including the behavior of data plane 454B. Operating system 464 of control plane 454A provides a run-time environment for multiple different processes. Operating system 464 may represent, for example, a UNIX operating system derivative such as Linux or Berkeley Software Distribution (BSD). Operating system 464 offers libraries and drivers by which processes may interact with data plane 454B, for example, or other hardware of network device 470, including a file-system, storage device(s), and main memory for network device 470. Libraries and drivers of operating system 464 may include Application Programming Interfaces (API's) that provide standard interfaces for developers to invoke the functionality of operating system 464 and network device 470 exposed by the libraries and drivers.

Control plane 454A executes one or more processes. Routing protocol unit 444 represents a routing protocol process that executes one or more routing protocols 458 by which at least some of the routing information stored to one or more routing tables 460 may be determined. For example, routing protocols 458 may include the RIFT protocol. Routing tables 460 represent a data structure for storing routing information and may represent tables, lists, trees/tries, or other data structures. A routing table may alternatively be referred to as a routing information base or may alternatively be considered a data structure within the routing information base of the network device 470.

Routing tables 460 stored to a computer-readable storage device of control unit 452 (not shown in FIG. 4) may include information defining at least a portion of a network topology of a network, such as IP fabric 118 of FIG. 1. Each of routing tables 460 may be associated with a different address family or network layer protocol, such as unicast or multicast IPv4 and IPv6, and MPLS. Any one or more of routing tables 460 may be predefined by the routing protocol unit 444 or may be explicitly created by an administrator (e.g., administrator 112 or 212) and/or a virtual network controller (e.g., virtual network controller 114, 214, 314) using configuration interface 473. Network device 470 receives configuration data via the configuration interface 473 and stores the configuration data to configuration database 465. In one or more examples, configuration database 465 may include one or more routing policies/settings 461 and state/log information 482 that may be utilized by routing protocol unit 444. Routing policies/settings 461 may include router particular policies and/or settings that are set within configuration database 465 for network device 470. State/log information 482 may include any state or other log information that may be captured and stored by network device 470 within configuration database 465.

Configuration interface 473 is a process executing on control plane 454A that provides an interface by which administrator. a network operator, network management system, and/or virtual network controller may modify the configuration database 465 of network device 470. Configuration interface 473 may present a Command Line Interface (CLI) and/or a graphical user interface (GUI) by which an administrator or other management entity may modify the configuration of network device 470 using text-based commands and/or graphical interactions, respectively, shown as vendor-specific device configuration information 467 in FIG. 4. In addition, or in the alterative, configuration interface 473 may present an agent that receives Simple Network Management Protocol (SNMP), Border Gateway Protocol messages, or NET CONF commands from a management device and/or virtual network controller (e.g., virtual network controller 114, 214, 314) to set and retrieve configuration information in configuration database 465 for network device 470. In certain examples, configuration interface 473 may be a HTTP-based RESTful interface using JavaScript Object Notation (JSON) or eXtensible Markup Language data objects for exchanging configuration data and routing information between the virtual network controller and network device 470.

Command interface 474 of network device 470 may provide another interface to configuration database 465 and routing protocol unit 444 via vendor-specific commands/ command information 468 commands that are received from an external source, such as an administrator or virtual network controller. Command interface 474 is configured to process incoming commands received at network device 470. Command interface 474 is configured to provide support for any number of different interfaces, similar to configuration interface 473 (e.g., CLI, GUI, SNP, BGP, NET CONF).

As described previously, virtual network controller 314 may send vendor-specific configuration information and vendor-specific command information 468 to network devices, such as network device 470, via analytics unit 335, device configuration unit 338, and/or control unit 341. Configuration interface 473 of network device 470 may receive such vendor-specific device configuration information 467 that is provided by virtual network controller 314, and may also receive such vendor-specific device command information 468 that is provided by virtual network controller 314. Maintenance mode unit 475 of network device 470 may be configured to perform one or more maintenance operations for network device 470 when network device 470 is in a maintenance mode.

For example, maintenance module unit 475 may interact with configuration interface 473, command interface 474, configuration database 465, and/or routing protocol unit 444 to receive, from virtual network controller 314 via configuration interface 473, first configuration information that is included in vendor-specific device configuration information, causing network device 470 to switch into a maintenance mode and enable diversion of network traffic from network device 470 to another device in the network. Network device 470 may then receive one or more commands from virtual network controller 314 via command interface 474, included in vendor-specific device command information 468, to request network traffic information associated with traffic flow through network device 470. Network device 470 may provide such information back to virtual network controller 314 via command interface 474, and virtual network controller may then utilize such information to verify that network device 470 has diverted traffic to the other device.

In response to this verification, virtual network controller 314 may initiate one or more maintenance procedures on network device 470 while it is in the maintenance mode. For example, maintenance mode unit 475 may enter the maintenance mode and perform these maintenance procedures (e.g., software upgrade procedures) upon receiving corresponding configuration information 467 and/or command information 468 to configure and perform these maintenance procedures. Network device 470 may receive, from virtual network controller 314 via configuration interface 473, second configuration information that is included in vendor-specific device configuration information, which causes network device 470 to switch out of the maintenance mode and enable reversion of network traffic from the other device back to network device 470. In some cases, network device 470 may receive the second configuration information from network controller 314 after completion of the one or more maintenance procedures on network device 470.

Routing protocol unit 444 resolves the topology defined by routing information in routing tables 460 to select and/or determine one or more active routes through the network. Routing protocol unit 444 may then synchronize data plane 454B with these active routes, where data plane 454B maintains a representation of these routes as forwarding table 466 (alternatively, "forwarding information base (FIB) 266"). Routing protocol unit 444 may generate forwarding table 466 in the form of a radix or other lookup tree to map packet information (e.g., header information having destination information and/or a label stack) to next hops and ultimately to interface ports of IFCs 446. The operating system 464 kernel may maintain a master copy of the forwarding table 466 and install portions of the master copy to forwarding components of data plane 454B, such as packet forwarding engines.

Forwarding or data plane 454B represents hardware or a combination of hardware and software of control unit 452 that forwards network traffic in accordance with forwarding table 466. Data plane 454B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a network device 470 chassis or combination of chassis.

FIG. 5 is a conceptual diagram illustrating an example of a translation of vendor-agnostic device information into vendor-specific device information based on a high-level data model, in accordance with one or more techniques of the disclosure. As described previously, a virtual network controller (e.g., virtual network controller 114 in FIG. 1, virtual network controller 214 in FIG. 2, virtual network controller 314 in FIG. 3) may receive or process a high-level data model that is associated with a topology of a network, and may determine, based on this model, vendor-agnostic device information for each of one or more network devices in the network. The virtual network controller may then translate this vendor-agnostic device information into vendor-specific device information for each respective device, which may include configuration and command information that is sent to the respective devices for maintenance mode and related operations. FIG. 5 illustrates an example of the translation process.

For example, virtual network controller 314 may utilize device configuration unit 338, including device manager 313, to perform the translation process of FIG. 5. Device manager 513 illustrated in FIG. 5 may be one example of device manager 313 shown in FIG.

Device manager 513 may process, as input, a high-level data model (e.g., a user intent-based networking/data model that may in some examples be received from administrator 112 (FIG. 1) and/or administrator 212 (FIG. 2) via interface unit 339 (FIG. 3)) and one or more node profiles 581. High-level data model and node profiles 581 may be stored in data models 330, device state information 332, and/or configuration information 333 shown in FIG. 3

In some examples, high-level data model 580 may capture high-level information (e.g., user intent information) for the underlay and overlay networking parameters. As a result, high-level data model 580 may include information for both the physical and virtual networks in a given data center, such as data center 102 (FIG. 1) or data center 202 (FIG. 2). This model may comprise a network-wide configuration model for layer 2 (L2) switching and layer 3 (L3) routing protocols.

In some examples, the user may specify a request and/or parameters related to desired maintenance mode operations that are to be performed in the network, and these may then be captured in high-level data model 580. For example, administrator 112 or 212 may request that all network devices in the network be upgraded. Virtual network controller 314 may then identify a maintenance mode strategy and determine an order in which network devices in the network are to be upgraded, as described herein. In some cases, administrator 112 or 212 may also specify a time period in which the maintenance mode operations are to be performed. In such fashion, the user may provide information associated with a general intent (e.g., upgrade devices in the fabric), which may be captured in high-level data model 580 and used by device manager 513.

Node profiles 581 may include additional parameters that are not captured specifically in high-level data model 580. Various customizations to high-level data model 580 may be made via adjustment or customization of node profiles 581. Each one of node profiles 581 may, in some cases, be particular to a specific vendor. Each node profile may include vendor information, device family information, supported hardware information, supported physical role information, and/or routing/bridging role information. In some cases, each node profile may also include device role-to-feature role mapping information (e.g., device role to Ansible feature role mapping information), which may be used by device manager 513. Thus, node profiles 581 may include vendor-specific and/or feature-specific parameters.

Device manager 513 may generate vendor-agnostic device information 584 based on the inputs provided by high-level data model 580 and node profiles 581. Vendor-agnostic device information 584 may also be referred to as device abstract configuration information. Vendor-agnostic device information 584 is agnostic, per-device configuration information for each individual network device in a network. In some examples, vendor-agnostic device information 584 may comprise Extensible Markup Language (XML) schema or Yet Another Next Generation (YANG) schema information.

Virtual network controller 314 may then utilize device configuration unit 338 to implement one or more translation processes 586 to translate vendor-agnostic device information 584 into vendor-specific device information 588. Vendor-specific device information 588 may also be referred to as vendor specific, or concrete, device configuration information. Each individual network device in the network may have both vendor-agnostic device information 584 and vendor-specific device information 588. In some examples, vendor-specific device information 588 may be customizable via the use, e.g., of Jinja2 templates for each different vendor.

As a result, device configuration unit 338 may be configured to generate both vendor-agnostic device information 584 and vendor-specific device information 588 in the manner illustrated in FIG. 5. Vendor-agnostic device information 584 may include vendor-agnostic device configuration and/or command information, and vendor-specific device information 588 may include vendor-specific device configuration and/or command information, as well. Virtual network controller 314 illustrated in FIG. 3 may send vendor-specific device information 588 to individual network devices for which the vendor-specific device information 588 has been generated. For example, as illustrated for network device 470 in FIG. 4, virtual network controller 314 may provide vendor-specific device configuration information 467 to network device 470 via configuration interface 473, and may provide vendor-specific device command information 468 to network device 470 via command interface 474. In this example, vendor-specific device configuration information 467 and vendor-specific device command information 468 may each be included in vendor-specific device information 588 illustrated in FIG. 5, which is translated from vendor-agnostic device information 584. Additional information regarding translation of high-level configuration instructions to low-level device configuration can be found in U.S. patent application Ser. No. 15/198,657, filed Jun. 30, 2016, and entitled TRANSLATING HIGH-LEVEL CONFIGURATION INSTRUCTIONS TO LOW-LEVEL DEVICE CONFIGURATION, which is hereby incorporated by reference.

Figure 6:
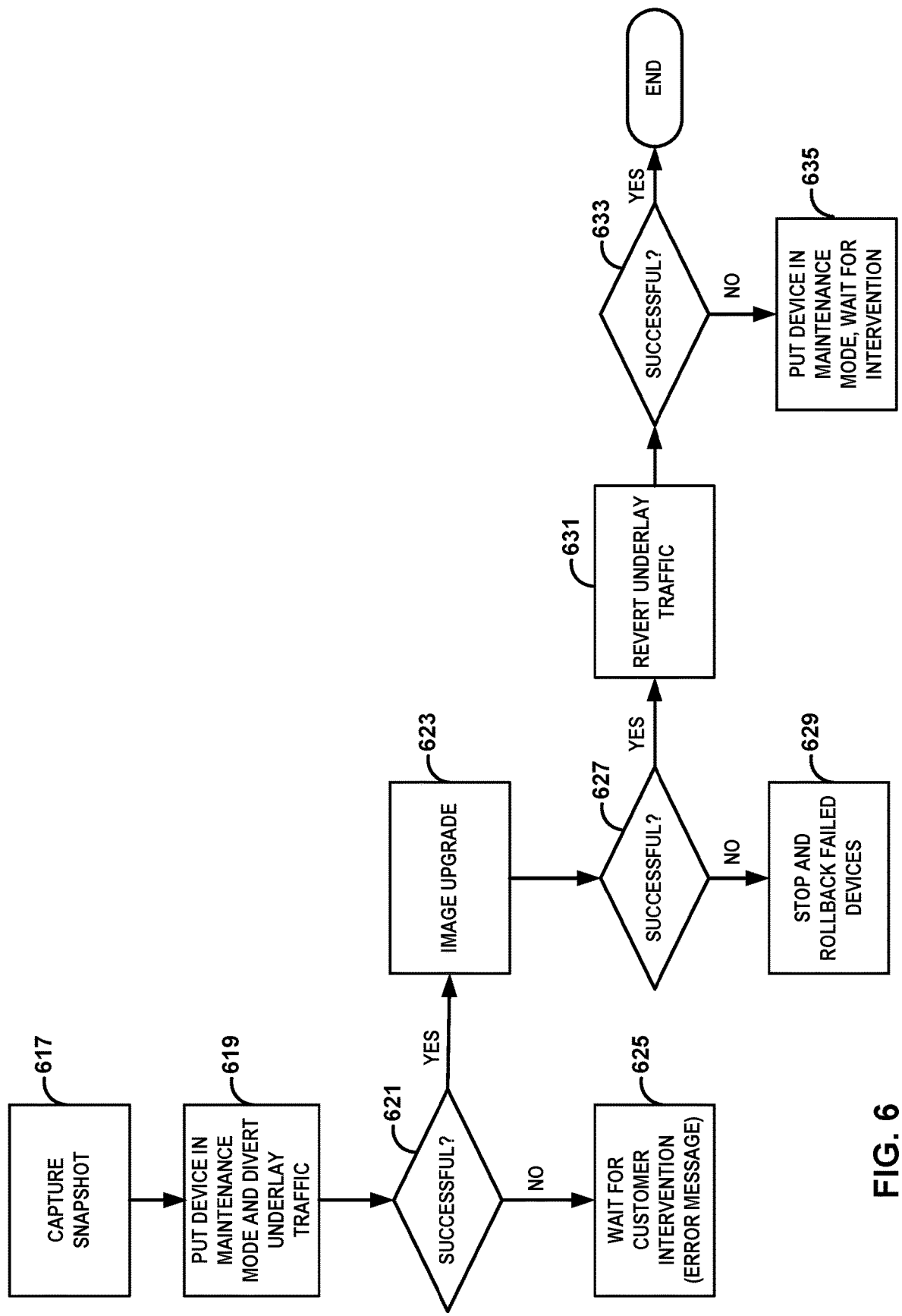
FIG. 6 is a flow diagram illustrating an example process for initiating an image upgrade on a network device, in accordance with one or more techniques of the disclosure.

FIG. 6 is a flow diagram illustrating an example process for initiating an image upgrade on a network device, in accordance with one or more techniques of the disclosure. An image update is one example of the type of maintenance procedure that can be performed on a network device in response to receiving configuration information from a virtual network controller, as described above.

Performing an image/software upgrade on a network device may be a time-consuming task. Whenever a device is re-imaged, it goes through a series of steps that may also include a reboot. Depending on the size of the image or upgrade, it may take many minutes (e.g., twenty minutes) for the device to come back online and start functioning again. During this procedure, if live traffic is still going through the device, a number of packets are lost. This packet loss has an adverse effect on the performance of the fabric, especially when multiple devices are being upgraded simultaneously. Thus, through implementation of one or more of the techniques disclosed herein, for a controller-assistance maintenance procedure (e.g., software update), the virtual network controller may configure a network device to divert the traffic to another device in an effort to achieve zero packet loss.

Through configuration of a network device (e.g., network device 470 illustrated in FIG. 4) by the virtual network controller (e.g., virtual network controller 314 illustrated in FIG. 3), as described above, the network device can enter or be switched into a state referred to as a maintenance mode, into which the device can be place into before performing a software upgrade (or any other maintenance procedure). After the maintenance procedures have been completed, the network device can be restored back to its original state. For purposes of illustration only, and in the description of FIG. 6 below, reference will be made to network device 470 and virtual network controller 314.

According to one or more examples, there are three activities related to putting network device 470 into maintenance mode: (i) capturing device snapshot/bringing down the device; (ii) performing the maintenance activity; and (iii) bringing the device back up/verification. Initially, virtual network controller 314 may send configuration information and/or commands to network device 470 to capture the running system state of network device 470 for post-upgrade verification, and cause network device 470 to drain out the traffic flowing through it and redirect in onto other equally capable device. Virtual network controller 314 also is configured to verify that there is zero traffic flow through network device 470.

Upon such verification, virtual network controller 314 may initiate the maintenance procedures (e.g., image updates) to be performed on network device 470. In some cases, this may be a time-consuming task that network device 470 will perform after being put into maintenance mode. After the maintenance procedures have been performed, network device 470 can be brought back up and restored into service. In addition, virtual network controller 314 is configured to send one or more commands to network device 470 to verify that is it carrying, e.g., the expected level of live traffic, and also that it is in the proper or original operational state based on the previously captured pre-maintenance snapshot. In various examples, no live user traffic is lost during this procedure.

In the example illustrated in FIG. 6, the particular maintenance procedure that is performed in network device 470 is an image, or software, upgrade. The upgrade may address various issues or conditions, such as a bug that is to be resolved, a failing component, a running release that is going end-of-service, an expiring software license, or other issue. However, in other examples, putting a device into maintenance mode may be utilized for various other types of maintenance procedures that may be performed on network device 470, such as procedures to fix or replace a physical component of network device 470, adding or removing physical connections to network device, or other maintenance procedures.

To initiate the process of configuring network device 470 to switch into maintenance mode and initiating the performance of maintenance operations, such as by virtual network controller 314, a user (e.g., administrator 112 in FIG. 1, administrator 212 in FIG. 2), and/or an orchestration engine (e.g., orchestration engine 213 in FIG. 2), may provide an indication of one or more network devices in a network are to be placed in a maintenance mode. For example, the user can select a "maintenance mode" operation and select one or more network devices to which the maintenance mode may be applied, which may comprise high-level intent-based information that may be captured in a data model (e.g., high-level data model 580 (FIG. 5) stored in data models 330 (FIG. 3)). In some cases, specific network devices may be specific. In other cases, the entire network of devices may be specified. For example, a user may interact with a user interface to specify that one or more specific network devices, such as network device 470, is to be upgraded. However, the user may, in another example, more generically specify in the user interface that network devices in the network, or in the fabric, are to be upgraded as appropriate, or as needed, thereby enabling virtual network controller 314 to determine an upgrade strategy that specifies which particular network devices are to be upgraded, and an order or sequence in which they are to be upgraded, as previously described. As noted above, the user's intent-based information may be captured in a high-level data model, such as high-level data model 580. At this point, virtual network controller 314 may initiate the automated workflow illustrated in FIG. 6 to bring each identified device down, initiate the upgrade, and then bring each device back up.

Whenever a device such as network device 470 goes through the maintenance mode procedure, the status of network device 470 may be logged periodically to keep the user and virtual network controller 314 updated. These logs (which may be referred to as "job logs") may describe the current phase network device 470 is in or the activity being performed on the device (e.g., "Putting device into maintenance mode," "Capturing snapshot of the device," "Bringing device up from maintenance mode"). Other log/state information may be provided, such as job percentage completion information and current device status information (e.g., maintenance mode or other status). This information may be stored in state/log information 482 of network device 470. In addition, network device 470 may provide this information to virtual network controller 314 via command interface 474 in response to one or more commands included in commands information 468 sent by virtual network controller 314. In such fashion, virtual network controller 314 may obtain current state and log information from network device 470.

In some examples, virtual network controller 314 may provide any of such information to a user (e.g., administrator 112 or 212) via a portal application, which may be included in or coupled to interface unit 339. The portal application may provide user interface functionality through which the user can provide input to and receive output from the portal application. For example, virtual network controller 314 may output the log and/or state information to the user via this portal application, such that the user may be informed of such information (e.g., before, during, and/or after upgrade or other maintenance operations are performed).

Prior to initiating the process illustrated in FIG. 6, virtual network controller 314 may, in some examples, perform certain role discovery and validation checks before putting network device 470 into maintenance mode. In a cloud Fabric architecture, there are multiple device roles. Each network device role has a specific placement in the cloud fabric topology and may use technologies specific to the role. Hence, some of the aspects for enabling seamless maintenance for each role may be unique to that role. Once the user (e.g., administrator 112/212) has selected a device/devices on perform the maintenance procedure (or, in some cases, after generally providing an indication to perform maintenance procedures on any network devices in the fabric, as needed), virtual network controller 314 may determine the role of each identified network device, such as network device 470, in order to push appropriate configurations.

For example, device/role discovery unit 336 (FIG. 3), included in analytics unit 335, may determine the roles of network devices. In some cases, device/role discovery unit 336 may access topology information 331 to obtain role information. In some cases, device/role discovery unit may access a virtual network computing (VNC) to obtain such role information. Upon obtaining role and/or topology information, virtual network controller 314 may be configured to determine a maintenance mode strategy to identify the sequence or ordering of network devices, including network device 470, in which they are put into maintenance mode one after the other. In some cases, the maintenance mode strategy may specify that multiple network devices may be placed into maintenance mode in parallel. Examples of devices roles may be: CRB-Access@Leaf; CRB-Gateway@Leaf; DC-Gateway@Leaf; CRB-Gateway@Spine; DC-Gateway@Spine, based on the type of node and/or whether the node is a leaf node or spine node. One example of a maintenance mode strategy or sequence in which these network devices are placed into maintenance mode based on their defined roles is as follows: CRB-Access@Leaf- ->CRB-Gateway@Leaf- ->DC-Gateway@Leaf- ->CRB-Gateway@Spine- ->DC-Gateway@Spine.

After role discovery, virtual network controller 314 may perform one or more validation checks before bringing down network device 470. For example, virtual network controller 314 may check to determine if network device 470 is a multi-homed device. This check may be used to make sure that there is another equally capable device (e.g., a device with the same ESI (Ethernet segment identifier) number) to which the live traffic from network device 470 can be directed. Virtual network controller 314 may also perform a validation check for device image compatibility, for examples in which the maintenance operations comprise image or software upgrades. The selected image should be compatible with the network devices identified by virtual network controller 314 for upgrade. Once the validation checks have been completed, the maintenance procedure illustrated in FIG. 6 may begin, according to certain examples.

The process illustrated in FIG. 6 begins by bringing down network device 470. This phase may include three tasks: capturing the snapshot of network device 470 (617 as illustrated in FIG. 6), putting network device 470 into maintenance mode and diverting the underlay traffic from network device (619), and verifying the diversion (621). The implementation details for each of these tasks could vary depending on whether network device is a spine or a leaf device.

Capturing the snapshot of network device 470 includes checking the health of network device 470. For example, virtual network controller 314 may send one or more commands for execution on network device 470 (e.g., commands included in vendor-specific device command information 468 provided via command interface 474 of network device 470, shown in FIG. 4), to gather and verify details from network device 470. For example, these commands could gather and verify details from network device 470, such as no BGP flaps, consistent EVPN route count, no-core-dumps, no interface flaps, no packet forwarding engine (PFE) drops, and the like. The commands may be executed on network device 470, and the snapshot information may be provided back to virtual network controller 314 and stored, e.g., in device state information 332. This information may be subsequently used, after bringing network device 470 back up after the software upgrade process is complete, for comparison to ensure that network device 470 has been brought back to the correct operational state.

The commands that may be sent by virtual network controller 314 to network device 470 to capture snapshot information may depend, in some cases, on whether network device 470 is a leaf device or a spine device. For example, if network device 470 is a leaf device, virtual network controller 314 may send commands for one or more of the following to capture snapshot information from network device 470: (a) software information; (b) system core dumps; (c) routing-engine CPU information; (d) linecard CPU and memory; (e) BGP summary peering state; (f) route summary information; (g) system alarms; (h) chassis alarms; (i) configuration; (j) interface counters data; (k) BGP neighbor information and flapping; (l) mac-address table information; (m) Open Shortest Path First (OSPF) neighbor information; (n) firewall cluster status; (o) Link Aggregation Control Protocol (LACP) state of all interface during the PRE-check phase. As another example, if network device 470 is a spine device, virtual network controller 314 may send commands for one or more of the following to capture snapshot information from network device 470: (a) software information; (b) system core dumps; (c) routing engine CPU information; (d) linecard CPU and memory; (e) BGP summary peering state; (f) route summary information; (g) system alarms; (h) chassis alarms; (i) configuration; (j) interface counters data; (k) BGP neighbor information and flapping; (l) mac-address table information; (m) OSPF neighbor information; (n) firewall cluster status; (o) PIM neighbor information.

In some examples, prior to initially configuring network device 470, virtual network controller 314 may capture certain state information for network device 470 device, such as BGP community information and corresponding priority information for network paths on network device 470. Virtual network controller 314 may utilize this community and/or priority information when setting relative priorities in the configuration information that is sent to network device 470 for management of maintenance mode operations. For example, virtual network controller 314 may set such relative priority information in the configuration information that is sent and kept initially as inactive on network device 370, and then later activated by virtual network controller 314 upon sending further configuration information to initiate the maintenance mode on network device 470.

Once the snapshot information for network device 470 has been captured, virtual network controller 314 may send configuration information to network device 470 (e.g., via configuration interface 473 shown in FIG. 4, as previously described) to put network device 470 into maintenance mode and diverting the underlay traffic from network device 470 (619). In certain examples, this task may involve two sub-tasks: pushing network device 470 into maintenance mode by sending down appropriate configurations (e.g., via configuration interface 473), and diverting the traffic from network device 470 into another capable device belonging to the same upgrade group (e.g., another device with the same ESI number). As previously described, virtual network controller 314 may send various vendor-specific device configuration information 467 to network device 470 via configuration interface 473. The configuration information that is pushed down to network device 470 may, in some cases, vary depending on whether network device 470 is a leaf or a spine device. In some examples, and as noted earlier, virtual network controller 314 may implemented or use Jinja templates to render the configuration information that is to be pushed down to network device 470.

As described above, virtual network controller 314 may determine a maintenance mode strategy to identify a particular sequence or order in which network devices are upgraded. Depending on the role of a given network device, such as network device 470, and place it takes in the defined sequence, virtual network controller 314 may push down configuration information to network device 470 based on the maintenance mode strategy and at a certain time based on the strategy. In some examples, virtual network controller 314 may perform additional checks to verify if network device 470 has any extra capabilities and, according to the results, may push one or more configurations down to network device 470 to achieve both the maintenance mode and traffic diversion successfully.

Virtual network controller 314 is configured to verify suspension of traffic through network device 470 and successful diversion of traffic to another device. Various configuration metrics may be used for this verification. For example, virtual network controller 314 may send one or more commands to network device 470, via command interface 474, to gather statistics or metrics associated with the amount of traffic through network device 470 (e.g., number of BGP sessions) in order to determine if traffic has been drained from network device 470. If such verification fails ("NO" branch of 621 in FIG. 6), virtual network controller 314 may output an error message and wait for customer intervention. In such a situation, virtual network controller 314 may refrain from proceeding to initiate the image upgrade of network device 470.

If, however, traffic has been successful drained from network device and diverted to another device ("YES" branch of 621 in FIG. 6), virtual network controller 314 may proceed to initiate the image upgrade procedure on network device 470 (623). In this case, virtual network controller 314 may initiate an image upgrade workflow on network device 470. A single job may be spawned on network device 470, although multiple devices may be upgraded in parallel depending on the determined maintenance mode strategy.

As described above, virtual network controller 314 may determine a maintenance mode (or upgrade) strategy, and identify an order in which network devices are to be upgraded. In some cases, virtual network controller 314 may be configured to upgrade multiple network devices simultaneously, or in parallel. In some examples, virtual network controller 314 may identify batches or groups of network devices, and may upgrade these groups in sequence. However, for each group, virtual network controller 314 may upgrade the individual network devices within each group in parallel.

If the upgrade fails ("NO" branch of 627), virtual network controller 314 may stop the process and roll back network device 470 to its pre-upgrade state, based on the previously captured snapshot state information retrieved and stored by virtual network controller 314.

If, however, the image/software upgrade is successful ("YES" branch of 627), virtual network controller 314 may bring network device 470 back up from maintenance mode and revert the underlay traffic back to network device 470 (631), where aspects of these tasks may vary depending on whether network device 470 is a spine or a leaf device.

In order to bring up network device 470 from maintenance mode, virtual network controller 314 may pushing appropriate configuration information down to network device 470, as described previously (e.g., by sending further vendor-specific device configuration information 467 to network device 470 via configuration interface 473). Sending this further configuration information may cause network device 470 to attempt to revert traffic back to network device 470. Virtual network controller 314 may then send one or more commands to network device 470, via command interface 474, to obtain traffic flow information from network device 470 and verify that traffic has reverted back to network device 470.

In addition, virtual network controller 314 may capture new snapshot state information from network device 470 and compare this new state information with the previously captured snapshot state information to verify proper or normal operation of network device 470. In various cases, capturing the new snapshot state information involves executing, by virtual network controller 314, the same set of commands on network device 470 that were earlier executed for the previously captured snapshot. The new snapshot device information for network device 470 is matched with the previous snapshot device information to verify if all the functionality of network device 470 has been brought back to its pre-upgrade state. If the verification of state and reversion of traffic back to network device 470 is confirmed ("YES" branch of 633), the process of FIG. 6 ends. If, however, the verification fails ("NO" branch of 633), virtual network controller 314 may send configuration information to network device 470 back into maintenance mode and await further customer intervention.

Figure 7:
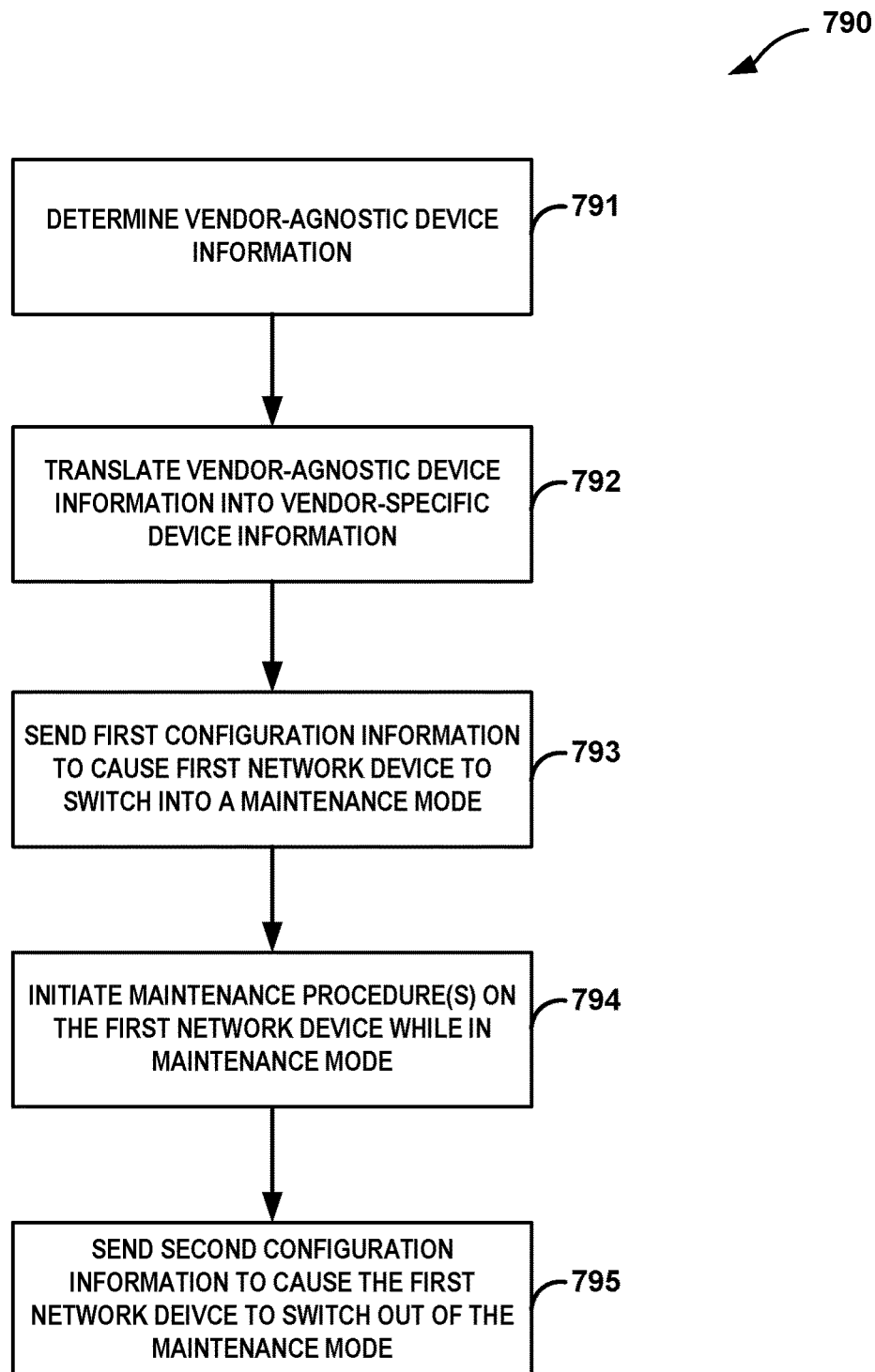
FIG. 7 is a flow diagram illustrating an example process for configuring and initiating the performance of certain maintenance mode operations (e.g., an image or software upgrade) on a network device, in accordance with one or more techniques of the disclosure.

FIG. 7 is a flow diagram illustrating an example process 790 for configuring and initiating the performance of certain maintenance mode operations (e.g., an image or software upgrade) on a network device, in accordance with one or more techniques of the disclosure. The example process 790 may be performed by a network controller, such as virtual network controller 114 (FIG. 1), virtual network controller 214 (FIG. 2), and/or virtual network controller 314 (FIG. 3), to initiate the performance of maintenance mode operations on any network device, such as any of devices 104/106/108 (FIG. 1), 204/208 (FIG. 2), and/or 470 (FIG. 4).

Process 790 includes determining (791), by a network controller (e.g., network controller 314) comprising one or more processors, and based on a high-level data model associated with a topology of a network, vendor-agnostic device information for a first network device (e.g., spine device 104A) in the network, and translating (792), by the network controller, the vendor-agnostic device information into vendor-specific device information for the first network device. Process 790 further includes sending (793), by the network controller and to the first network device, first configuration information that is included in the vendor-specific device information. Sending the first configuration information causes the first network device to switch into a maintenance mode and enables a diversion of network traffic from the first network device to a second network device (e.g., spine device 104B) in the network. Process 790 further includes, responsive to verifying that the first network device has diverted traffic to the second network device, initiating (794), by the network controller, one or more maintenance procedures on the first network device while the first network device is in the maintenance mode, and sending (795), by the network controller and to the first network device, second configuration information that is included in the vendor-specific device information. Sending the second configuration information causes the first network device to switch out of the maintenance mode and enables a reversion of network traffic from the second device back to the first network device.

In some examples, initiating the one or more maintenance procedures on the first network device includes initiating one or more software upgrade procedures on the first network device while the first network device is in the maintenance mode.

In some examples, process 790 further includes receiving an indication of a plurality of network devices included in the network, determining, based on the topology of the network, a maintenance mode strategy, and, before sending the first configuration information to the first network device, selecting, based on the maintenance mode strategy, the first network device from the plurality of network devices. In certain cases, process 790 may further include, before sending the first configuration information, sending, to the first network device, maintenance mode configuration information that is included in the vendor-specific device information, where the maintenance mode configuration information is kept inactive on the first network device. Sending the first configuration information to the first network device includes sending the first configuration information to activate the maintenance mode configuration information and cause the first network device to switch into the maintenance mode and divert network traffic from the first network device to the second network device. Sending the second configuration information to the first network device includes sending the second configuration information to deactivate the maintenance mode configuration information and cause the first network device to switch out of the maintenance mode and revert network traffic from the second device back to the first network device.

Determining the maintenance mode strategy may include determining, based on the topology of the network, a defined order in which to place the plurality of network devices into the maintenance mode. Selecting the first network device may include selecting, based on the defined order, the first network device as a first device from the plurality of network devices to place into the maintenance mode. In certain cases, determining the defined order may include receiving, from a database, an indication of defined role of each of the plurality of network devices in the network. In certain cases, determining the defined order may include determining the defined order in which one or more groups of the plurality of network devices may be placed into the maintenance mode in parallel.

In some examples, verifying that the first network device has diverted traffic to the second network device includes sending, to the first network device, command information that is included in the vendor-specific device information, where the command information includes a request for network traffic information associated with traffic flow through the first network device. Verifying that the first network device has diverted traffic to the second network device further includes, responsive to sending the command information, receiving, from the first network device, the network traffic information associated with the traffic flow through the first network device, and verifying, based on the network traffic information, that network traffic has been diverted from the first network device.

In some examples, process 790 further includes, after sending the second configuration information to the first network device, sending, to the first network device, command information that is included in the vendor-specific device information, where the command information includes a request for network traffic information associated with traffic flow through the first network device. Process 790 also includes, responsive to sending the command information, receiving, from the first network device, the network traffic information associated with the traffic flow through the first network device, and verifying, based on the network traffic information, that network traffic has been reverted to the first network device.

In some examples, process 790 further includes, before sending the first configuration information to the first network device, capturing first system state information of the first network device, after sending the second configuration information to the first network device, capturing second system state information of the first network device, comparing the first system state information to the second system state information, and verifying, based on the comparing, an operational mode of the first network device.

In some examples, process 790 further includes, before sending the first configuration information to the first network device, verifying that the second network device has the same Ethernet segment identifier (ESI) as the first network device. In some examples, the first configuration information may comprise a first underlay routing protocol policy and a first overlay routing protocol policy associated with the network, and the second configuration information may comprise a second underlay routing protocol policy and a second overlay routing protocol policy associated with the network.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
   determining, by a network controller comprising one or more processors, and based on a high-level data model associated with a topology of a network, vendor-agnostic device information for a first network device in the network;
   translating, by the network controller, the vendor-agnostic device information into vendor-specific device information for the first network device;
   sending, by the network controller and to the first network device, first configuration information that is included in the vendor-specific device information, wherein sending the first configuration information causes the first network device to switch into a maintenance mode and enables a diversion of network traffic from the first network device to a second network device in the network;
   responsive to verifying that the first network device has diverted traffic to the second network device, initiating, by the network controller, one or more maintenance procedures on the first network device while the first network device is in the maintenance mode; and
   sending, by the network controller and to the first network device, second configuration information that is included in the vendor-specific device information, wherein sending the second configuration information causes the first network device to switch out of the maintenance mode and enables a reversion of network traffic from the second device back to the first network device.

2. The method of claim 1, wherein initiating the one or more maintenance procedures on the first network device comprises initiating one or more software upgrade procedures on the first network device while the first network device is in the maintenance mode.

3. The method of claim 1, further comprising:
   receiving an indication of a plurality of network devices included in the network;
   determining, based on the topology of the network, a maintenance mode strategy; and
   before sending the first configuration information to the first network device, selecting, based on the maintenance mode strategy, the first network device from the plurality of network devices.

4. The method of claim 3, further comprising:
   before sending the first configuration information, sending, to the first network device, maintenance mode configuration information that is included in the vendor-specific device information, wherein the maintenance mode configuration information is kept inactive on the first network device,
   wherein sending the first configuration information to the first network device comprises sending the first configuration information to activate the maintenance mode configuration information and cause the first network device to switch into the maintenance mode and divert network traffic from the first network device to the second network device, and
   wherein sending the second configuration information to the first network device comprises sending the second configuration information to deactivate the maintenance mode configuration information and cause the first network device to switch out of the maintenance mode and revert network traffic from the second device back to the first network device.

5. The method of claim 3,
   wherein determining the maintenance mode strategy comprises determining, based on the topology of the network, a defined order in which to place the plurality of network devices into the maintenance mode, and
   wherein selecting the first network device comprises selecting, based on the defined order, the first network device as a first device from the plurality of network devices to place into the maintenance mode.

6. The method of claim 5, wherein determining the defined order comprises receiving, from a database, an indication of defined role of each of the plurality of network devices in the network.

7. The method of claim 5, wherein determining the defined order comprises determining the defined order in which one or more groups of the plurality of network devices may be placed into the maintenance mode in parallel.

8. The method of claim 1, wherein verifying that the first network device has diverted traffic to the second network device comprises:
   sending, to the first network device, command information that is included in the vendor-specific device information, wherein the command information includes a request for network traffic information associated with traffic flow through the first network device;
   responsive to sending the command information, receiving, from the first network device, the network traffic information associated with the traffic flow through the first network device; and
   verifying, based on the network traffic information, that network traffic has been diverted from the first network device.

9. The method of claim 1, further comprising:
   after sending the second configuration information to the first network device, sending, to the first network device, command information that is included in the vendor-specific device information, wherein the command information includes a request for network traffic information associated with traffic flow through the first network device;
   responsive to sending the command information, receiving, from the first network device, the network traffic information associated with the traffic flow through the first network device; and
   verifying, based on the network traffic information, that network traffic has been reverted to the first network device.

37

10. The method of claim 1, further comprising:
before sending the first configuration information to the first network device, capturing first system state information of the first network device;
after sending the second configuration information to the first network device, capturing second system state information of the first network device;
comparing the first system state information to the second system state information; and
verifying, based on the comparing, an operational mode of the first network device.

11. The method of claim 1, further comprising:
before sending the first configuration information to the first network device, verifying that the second network device has the same Ethernet segment identifier (ESI) as the first network device.

12. The method of claim 1,
wherein the first configuration information comprises a first underlay routing protocol policy and a first overlay routing protocol policy associated with the network, and
wherein the second configuration information comprises a second underlay routing protocol policy and a second overlay routing protocol policy associated with the network.

13. A network controller system, comprising:
at least one data store configured to store device information for network devices in a network; and
at least one processor communicatively coupled to the at least one data store, wherein the at least one processor comprises processing circuitry configured to:
determine, based on a high-level data model associated with a topology of the network, vendor-agnostic device information for a first network device in the network;
translate the vendor-agnostic device information into vendor-specific device information for the first network device;
send, to the first network device, first configuration information that is included in the vendor-specific device information, wherein sending the first configuration information causes the first network device to switch into a maintenance mode and enables a diversion of network traffic from the first network device to a second network device in the network;
responsive to verifying that the first network device has diverted traffic to the second network device, initiate one or more maintenance procedures on the first network device while the first network device is in the maintenance mode; and
send, to the first network device, second configuration information that is included in the vendor-specific device information, wherein sending the second configuration information causes the first network device to switch out of the maintenance mode and enables a reversion of network traffic from the second device back to the first network device.

14. The network controller system of claim 13, wherein the at least one processor is further configured to:
receive an indication of a plurality of network devices included in the network;
determine, based on the topology of the network, a maintenance mode strategy; and

38 before sending the first configuration information to the first network device, select, based on the maintenance mode strategy, the first network device from the plurality of network devices.

15. The network controller system of claim 14, wherein the at least one processor is further configured to:
before sending the first configuration information, send, to the first network device, maintenance mode configuration information that is included in the vendor-specific device information, wherein the maintenance mode configuration information is kept inactive on the first network device,
wherein the at least one processor is configured to send the first configuration information to the first network device at least by being configured to send the first configuration information to activate the maintenance mode configuration information and cause the first network device to switch into the maintenance mode and divert network traffic from the first network device to the second network device, and
wherein the at least one processor is configured to send the second configuration information to the first network device at least by being configured to send the second configuration information to deactivate the maintenance mode configuration information and cause the first network device to switch out of the maintenance mode and revert network traffic from the second device back to the first network device.

16. The network controller system of claim 14,
wherein the at least one processor is configured to determine the maintenance mode strategy at least by being configured to determine, based on the topology of the network, a defined order in which to place the plurality of network devices into the maintenance mode, and
wherein the at least one processor is configured to select the first network device at least by being configured to select, based on the defined order, the first network device as a first device from the plurality of network devices to place into the maintenance mode.

17. The network controller system of claim 13, wherein the at least one processor is configured to verify that the first network device has diverted traffic to the second network device at least by being configured to:
send, to the first network device, command information that is included in the vendor-specific device information, wherein the command information includes a request for network traffic information associated with traffic flow through the first network device;
responsive to sending the command information, receive, from the first network device, the network traffic information associated with the traffic flow through the first network device; and
verify, based on the network traffic information, that network traffic has been diverted from the first network device.

18. The network controller system of claim 13, wherein the at least one processor is further configured to:
after sending the second configuration information to the first network device, send, to the first network device, command information that is included in the vendor-specific device information, wherein the command information includes a request for network traffic information associated with traffic flow through the first network device;

responsive to sending the command information, receive, from the first network device, the network traffic information associated with the traffic flow through the first network device; and verify, based on the network traffic information, that network traffic has been reverted to the first network device.

19. The network controller system of claim 13, wherein the at least one processor is further configured to:

before sending the first configuration information to the first network device, capture first system state information of the first network device;

after sending the second configuration information to the first network device, capture second system state information of the first network device;

compare the first system state information to the second system state information; and verify, based on the comparison, an operational mode of the first network device.

20. A method comprising:

receiving, by a first network device and from a network controller, first configuration information that is included in vendor-specific device information for the first network device;

responsive to receiving the first configuration information, switching, by the first network device, into a maintenance mode to enable a diversion of network traffic from the first network device to a second network device in the network;

after network traffic has been diverted from the first network device to the second network device, performing, by the first network device, one or more maintenance procedures while the first network device is in the maintenance mode;

receiving, by the first network device and from the network controller, second configuration information that is included in the vendor-specific device information; and after receiving the second configuration information, switching, by the first network device, out of the maintenance mode to enable a reversion of network traffic from the second device back to the first network device.

* * * * *